(12) United States Patent
Kilkki et al.

(10) Patent No.: US 6,421,335 B1
(45) Date of Patent: Jul. 16, 2002

(54) CDMA COMMUNICATION SYSTEM AND METHOD USING PRIORITY-BASED SIMA QUALITY OF SERVICE CLASS

(75) Inventors: Matti Kalevi Kilkki, Lexington, MA (US); Jussi Pekka Olavi Ruutu, Espoo (FI)

(73) Assignee: Nokia Telecommunications, Oy, Espoo (FI)

( * ) Notice: Subject to any disclaimer, the term of this patent is extended or adjusted under 35 U.S.C. 154(b) by 0 days.

(21) Appl. No.: 09/178,658

(22) Filed: Oct. 26, 1998

(51) Int. Cl.[7] ............................................... H04J 13/02
(52) U.S. Cl. ...................................... 370/342; 370/328
(58) Field of Search ................................ 370/342, 328, 370/335, 320, 310, 230, 232, 233, 235, 252, 395, 468, 412, 462, 428, 397, 429, 422

(56) References Cited

U.S. PATENT DOCUMENTS

| 5,539,729 A | 7/1996 | Bodnar | |
| 5,812,541 A | 9/1998 | Fuentes | 370/335 |
| 5,870,384 A | 2/1999 | Saluvuori | 370/235 |
| 6,041,039 A | 3/2000 | Kilkki | 370/230 |
| 6,147,970 A | 11/2000 | Troxel | 370/235 |
| 6,160,818 A | 12/2000 | Berger | 370/468 |
| 6,188,670 B1 | 2/2001 | Lackman | 370/231 |

FOREIGN PATENT DOCUMENTS

| EP | 0 680 159 | 4/1995 |
| GB | 2 310 972 | 9/1997 |
| WO | WO 98/45966 | 10/1998 |

OTHER PUBLICATIONS

"About CDMA," http://www.cdg.org/about₁₃cdma.html, last updated Jan. 26, 1999, pp. 1–3.
"Spread Spectrum Communication Principes," "Pseudorandom Signal Generation," http://www.ece.orst.edu/~rodrigfr/cdma/random.html, last updated Jan. 26, 1999, pp. 1–5.
"Spread Spectrum Communication Papers," "Tutorial," http://www.ece.orst.edu/~rodrigfr/cdma/tutorial.html, last updated Jan. 26, 1999, pp. 1–6.
"Spread Spectrum Communication Papers," "Tutorial 2," http://www.ece.orst.edu/~rodrigfr/cdma/tut2.html., last updated Jan. 26, 1999, pp. 1–5.

Primary Examiner—Douglas Olms
Assistant Examiner—Ricardo M. Pizarro
(74) Attorney, Agent, or Firm—Altera Law Group LLC

(57) ABSTRACT

A system and method for integrating a priority-based quality of service in CDMA communication systems that implement data packet transmission, in order to effectively allocate radio resources. Data packet transfers are selectively allocated over a wireless interface operating under a Code Division Multiple Access (CDMA) protocol. A nominal bit rate is established for each user desiring access to the CDMA interface. A relative packet priority is calculated for each of the data packets based on an actual bit rate at the source of the CDMA interface and the established nominal bit rate. An allowable packet priority is calculated for the CDMA interface based on a signal-to-noise ratio of the CDMA interface, and those of the data packets having a relative packet priority greater than or equal to the allowable packet priority of the CDMA interface are transmitted across the CDMA interface.

34 Claims, 14 Drawing Sheets

CDMA COMMUNICATION SYSTEM AND METHOD USING PRIORITY-BASED SIMA QUALITY OF SERVICE CLASS

FIELD OF THE INVENTION

The present invention relates generally to Code Division Multiple Access (CDMA) communication systems, and more particularly, to a system and method for integrating a priority-based quality of service in CDMA communication systems that implement data packet transmission, in order to effectively allocate radio resources.

BACKGROUND OF THE INVENTION

Future mobile cellular networks must be able to support data communication, particularly packet data communications. One question that is raised is how the radio resources are to be allocated in a system that transports data packets over the radio interface in an asynchronous manner. For example, where a mobile terminal transmits and receives internet protocol (IP) data packets, the radio resource may be used without any predictable pattern. Therefore, it would be beneficial to have a system and method that effectively allocates radio resources among different connections. One radio communications scheme that could provide such a radio interface for data communications is CDMA. The present invention describes various manners in which data packets can be communicated via a CDMA communications system, such that congestion problems can be effectively managed.

In order to fully appreciate the concept, purpose, and advantages of the present invention, a general understanding of Code Division Multiple Access (CDMA) radio technology is necessary. CDMA technology is fundamentally based on spread spectrum modulation. Generally, spread spectrum modulation is a type of modulation that scatters data transmissions across an available frequency band in a pseudo-random pattern. Spreading the data across the frequency spectrum causes the signal to be more resistant to noise, and has a high tolerance to jamming and signal interception.

A spread spectrum signal is one that is transformed with a function $e(c)$ using a code $c$. The code, typically a pseudo-random code, is a sequence that is combined with the data signal to transform the initial narrowband signal into a wideband signal that can have the appearance of a noise signal. The effect of this transformation is illustrated in FIG. 1, which includes FIGS. 1A, 1B and 1C.

Referring first to FIG. 1A, a narrowband signal $S_n$ 10a is shown in the frequency domain having a bandwidth $B_n$. The signal $S_n$ 10a is transformed by the function $e(c)$ using a code $c$ to produce the wideband signal $S_w$ 10b having bandwidth $B_w$ as shown in FIG. 1B. To create the wideband signal $S_w$, the narrowband signal $S_n$ is "spread out" using the function $e(c)$ over the increased bandwidth $B_w$, typically using a spreading technique such as direct sequence (DS) or frequency hopping (FH). These spreading techniques are well-known in the art. The wideband signal $S_w$ 10b is then transmitted, and the targeted receiver applies the same function $e(c)$ based on code $c$ to the transmitted wideband signal $S_w$ 10b to reproduce the initial narrowband signal $S_n$ 10c, as shown in FIG. 1C.

The term Code Division Multiple Access indicates that there can be several signals carried within the same frequency band or "channel" using different codes. This is possible because only the signal with the correct code $c_i$ can be reproduced into the narrowband signal at the targeted receiver. Signals transmitted with other codes $c_k$ are not decoded at that particular receiver, and these other transmitted signals will have a noise-like appearance at the receiver. FIG. 2 illustrates this concept.

FIG. 2A represents two independent narrowband signals $S_n^1$ 20a and $S_n^2$ 22a. These two signals could represent two independent data transmissions, voice transmissions, or the like. Narrowband signal $S_n^1$ 20a is transformed using code $c_1$ of the spreading function $e(c_1)$, and narrowband signal $S_n^2$ 22a is transformed using code $c_2$ of the spreading function $e(c_2)$, to respectively produce wideband signals $S^1$ 20b and $S_w^2$ 22b shown in FIG. 2B. The targeted receiver for original narrowband signal $S_n^1$ 20a decodes the signal using the same code $c_1$ to reproduce the narrowband signal $S_n^1$ 20c as shown in FIG. 2C. However, because that particular targeted receiver does not include the code $c_2$, signal $S_w^2$ 22c is not decoded, and remains a wideband signal $S_n^2$ 22c as illustrated in FIG. 2C. The overlapping signal area represented by block 24 represents the noise imparted to the signal $S_n^1$ 22c due to the wideband signal $S_w^2$ 22c.

As the number of signal transmissions over the common wideband channel increases (e.g., the number of concurrent users increases), it appears to the reproduced narrowband signal as an increase in background noise. This is illustrated in FIG. 3, which represents the signals seen at a particular signal receiver. As was described in connection with FIG. 2C, the overlapping area 24 is seen by the receiver as noise, so additional signals that are not decoded by that receiver are seen as cumulative noise. For example, FIG. 3 depicts a reproduced narrowband signal $S_n^1$ 30, and four other undecoded wideband signals $S_w^2$ 32, $S_w^3$ 34, $S_w^4$ 36, and $S_w^5$ 38. Each of the undecoded wideband signals cumulatively increases the noise on the decoded narrowband signal $S_n^1$ 32, as illustrated by overlapping noise blocks 40, 42, 44 and 46. Thus, the signal/noise ratio (SNR) of a single user decreases with the increasing number of users or transmitted signals in the common wideband channel. At some limit $N_{max}$, the number of users cannot be increased any more or the individual resulting narrowband signals become too weak. In practice, the users with the weakest signal due to distance and radio conditions are first to lose their radio connection.

In order to guarantee an adequate signal-to-noise ratio (SNR) for existing connections, a control system is required. This would allow a new user to utilize the communication interface only where an adequate SNR would still be available after the new signal has been included in the common wideband frequency channel.

One prior art method of appropriating an acceptable number of users is to count the number of users, and allow new users to be included on the communication interface only if the number of users remains below a predetermined maximum number. In such a case, there is no distinction between users, and all users are treated equally. It is essentially a first-come, first-served system. However, this type of system does not take into account the various needs of different users, and particularly their willingness to pay for a higher degree of certainty that their connection will be made available. Thus, a future third generation network cellular system must be able to differentiate the user desires and needs.

Such a fixed differentiation system may pose complexity problems however. This rigid differentiation scheme does not take into account the magnitude of short term connections that transport relatively short data packets. This type of system would lack efficiency by disallowing many short term transfers, and would inevitably waste available bandwidth capacity.

Therefore, there is a need in the communications industry for a communications control system that allocates radio resources using a dynamically variable priority-based system. Such a system would account for individual users' willingness to pay more for a higher degree of transmission certainty, or to pay less for noncritical applications. The present invention provides such a system while avoiding the potential complexities and inefficiencies of more rigid schemes. The present invention therefore overcomes the aforementioned and other shortcomings of the prior art, and provides these and additional advantages over the prior art.

SUMMARY OF THE INVENTION

The present invention is directed to a system and method for integrating a priority-based quality of service in CDMA communication systems that implement data packet transmission, in order to effectively allocate radio resources.

In accordance with one embodiment of the invention, a method is provided for selectively allocating data packet transfers over a wireless interface operating under a Code Division Multiple Access (CDMA) protocol. A nominal bit rate is established for each user desiring access to the CDMA interface. A relative packet priority is calculated for each of the data packets based on an actual bit rate of the source at the CDMA interface and the established nominal bit rate. An allowable packet priority is calculated for the CDMA interface based on a signal-to-noise ratio of the CDMA interface, and those of the data packets having a relative packet priority greater than or equal to the allowable packet priority of the CDMA interface are transmitted.

In accordance with a more specific embodiment of the invention, a method is provided for selectively allocating data packet transmission over a wireless interface implementing a Code Division Multiple Access (CDMA) protocol, for data packet transmission from a mobile communication unit (MCU) to a trunking network in a centralized implementation. A transmit request signal is transmitted from the MCU to the trunking network via a signalling channel, and the trunking network provides a request response to the MCU indicative of whether the trunking network will permit the data packet to be transmitted. In providing the request response, the trunking network performs a variety of the priority-based functions, including establishing the nominal bit rate for each of the users having access to the CDMA interface, calculating the relative packet priority for each data packet based on an actual bit rate of the sourcing unit at the CDMA interface and the nominal bit rate established for the corresponding one of the users, calculating a current allowable packet priority for the CDMA interface based on a signal-to-noise ratio of the CDMA interface, comparing the relative packet priority for each of the data packets to the current allowable packet priority of the CDMA interface, and setting the request response to indicate whether the data packet has a sufficiently high relative packet priority to gain access to the CDMA interface. The request response from the trunking network is received at the MCU, and the MCU transmits the data packets to the trunking network if the request response indicates that the relative packet priority is sufficiently high to gain access to the CDMA interface.

In such a centralized embodiment, the trunking network calculates a current allowable packet priority for the CDMA interface. In one embodiment, this includes determining the number of users or connections currently occupying the CDMA interface, determining a maximum number of users that are allowed on the CDMA interface such that a predetermined signal-to-noise ratio is not exceeded, calculating the current load condition on the CDMA interface based on a ratio of the number of users occupying the CDMA interface and the maximum number of users allowed on the CDMA interface, partitioning a range of possible load conditions into a range of allowable priority levels, and assigning the allowable priority level corresponding to the calculated current load condition as the current allowable priority level for the CDMA interface.

In accordance with another specific embodiment of the invention, a method is provided for selectively allocating data packet transmission over a wireless interface implementing a Code Division Multiple Access (CDMA) protocol, for data packet transmission from a trunking network to a mobile communication unit (MCU) in a centralized implementation. A nominal bit rate is established for each of a plurality of users having access to the CDMA interface. The trunking network performs a variety of the priority-based functions, including calculating a relative packet priority for each of the data packets based on an actual bit rate at the CDMA interface and the established nominal bit rate, calculating a current allowable packet priority for the CDMA interface based on a signal-to-noise ratio of the CDMA interface, comparing the relative packet priority for each of the data packets to the current allowable packet priority of the CDMA interface, and transmitting the data packets from the trunking network to the MCU if the relative packet priority of the data packets is equal to or greater than the current allowable packet priority of the CDMA interface.

In accordance with another specific embodiment of the invention, a method is provided for selectively allocating data packet transmission over a wireless interface implementing a Code Division Multiple Access (CDMA) protocol, for data packet transmission from a mobile communication unit (MCU) to a trunking network in a distributed, or shared, implementation. A nominal bit rate is established for each user having access to the CDMA interface. The MCU calculates a relative packet priority for each of the data packets based on an actual bit rate provided by the source at the CDMA interface and the nominal bit rate established for the corresponding one of the users. The trunking network calculates a current allowable packet priority for the CDMA interface based on a signal-to-noise ratio of the CDMA interface. The current allowable packet priority is transmitted from the trunking network to the MCU via a signalling channel, and the MCU compares the relative packet priority for each of the data packets to the current allowable packet priority of the CDMA interface. The data packets are transmitted from the MCU to the trunking network if the relative packet priority is equal to or greater than the current allowable packet priority at the CDMA interface.

In accordance with another aspect of the invention, a system is provided for selectively allocating data packet transfers over a wireless interface operating under a Code Division Multiple Access (CDMA) protocol, for data packet transmission between one or mobile communication units (MCU) and a trunking network. The system includes a memory to store a nominal bit rate indicator assigned to each potential connection of the CDMA interface. A bit rate measurement unit receives a data packet that is ready for transmission via the CDMA interface, and measures the bit rate at which the data packet will be transmitted. A packet priority level calculation unit receives the measured bit rate (MBR) and the nominal bit rate (NBR) indicator, and calculates a packet priority level for the data packet in response to the MBR and NBR. A comparator receives the packet priority level and an allowable packet priority level corresponding to the packet priority level required to access the CDMA interface. The comparator compares the packet priority level and the allowable packet priority level, and outputs an enable signal indicative of whether or not the packet priority level is greater than the allowable packet priority level. An output register enables transmission of the data packet when the enable signal indicates that the packet priority level is greater than the allowable packet priority level.

DETAILED DESCRIPTION OF THE VARIOUS EMBODIMENTS

Figures 1A, 1B, 1C:
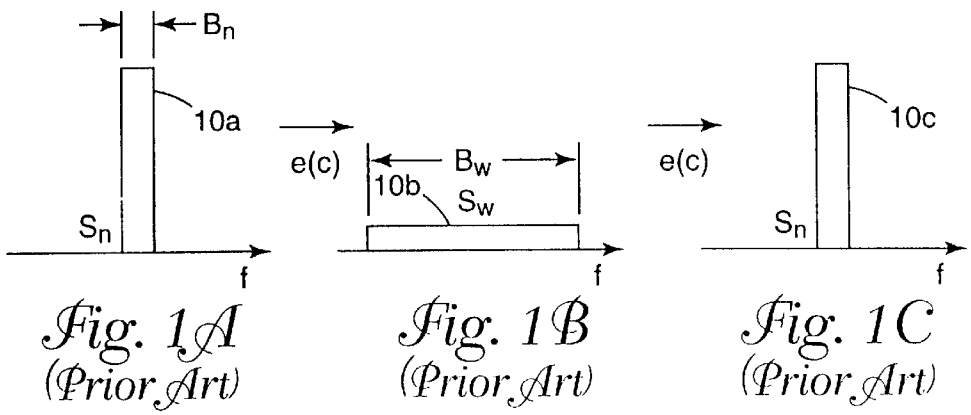
FIGS. 1A, 1B and 1C are illustrations of a prior art spread spectrum conversion from a narrowband signal, to a broadband signal, and back to a narrowband signal as is used in Code Division Multiple Access (CDMA) technology.
Figures 2A, 2B, 2C:
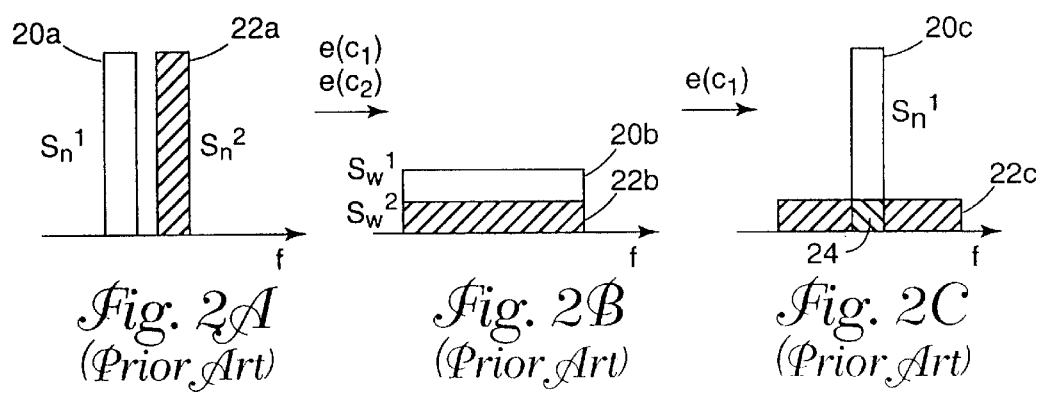
FIGS. 2A, 2B and 2C are illustrations of a prior art CDMA conversion of multiple signals.
Figure 3:
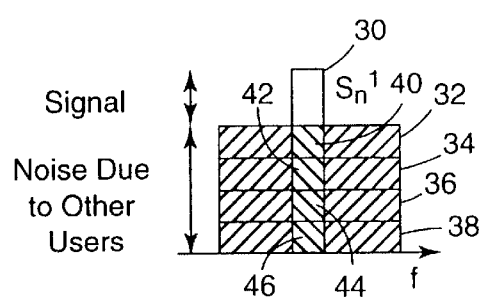
FIG. 3 is an illustration of a prior art CDMA conversion from broadband signals to narrowband signals which illustrates the cumulative noise effect of including additional signals in the CDMA channel.

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

As previously described, it would be beneficial to have a system and method to effectively allocate radio resources among different connections in a communications system such as a CDMA communications system. The present invention provides various manners in which data packets can be communicated via a CDMA communications system, such that congestion problems and priority concerns can be effectively and efficiently managed.

Data congestion is sometimes handled in traditional data networks using quality of service (QoS) classes. Each service class includes a number of QoS parameters that define the nature of the respective service category. For example, the service categories defined in the ATM Forum specification include a constant bit rate (CBR) category, a real-time variable bit rate (rt-VBR) category, a non-real-time variable bit rate (nrt-VBR) category, an unspecified bit rate (UBR) category, and an available bit rate (ABR) category. The present invention is employed within the context of a network service class that incorporates a priority-based quality of service. This service class, hereinafter referred to as the Simple Integrated Media Access (SIMA) service class, provides a network management architecture that addresses the quality of service requirements to support a variety of network services, including real-time and non-real-time services. It also provides for the implementation of a simple and effective charging capability that accounts for the use of network services.

Thus, the present invention provides for efficient control of data packets over a CDMA radio interface using a priority-based protocol, such as SIMA. The invention allows for differentiation between users and their corresponding user priority, thereby allowing users to pay more for a higher level of service. Currently, CDMA transmissions do not take into account the relative transmission priorities of users, which is undesirable for data transmission.

The CDMA interface can transport various types of data packets, including voice, video, data, and so forth, and can provide an interface between a mobile station (MS) and a cellular trunking network, multiple local area networks (LANs), two mobile stations, or any other network interface capable of implementing the CDMA protocol. The MS can represent any type of mobile communication unit, including a cellular/mobile telephone, computing device, facsimile equipment, wireless terminal, or other electronic equipment capable of communicating via spread spectrum technology.

The invention includes assigning each packet to be transmitted with a priority value upon transmission of the packet.

In one embodiment of the invention, this priority is based on a nominal bit rate (NBR) which is pre-assigned for each user or flow. A price for each NBR level is established, with higher priorities generally associated with higher costs. A data rate measurement system measures the instantaneous measured bit rate (MBR), and the ratio of the MBR to the NBR determines the priority for the packet. With an increasing ratio of MBR to NBR, the priority of the packets will decrease, since the actual or measured bit rate will increase relative to the established NBR. Depending on the load of the wireless interface, the interface channel will be assigned an allowed priority level, $PL_a$. In one embodiment of the invention, the load is determined as the ratio of number N users to the maximum number of users $N_{max}$ allowed. Thus, $PL_a$ changes over time with a changing number of concurrent users. Where the packet has a priority equal to or greater than $PL_a$, the packet is transmitted. Otherwise it is selectively discarded or suspended for a period of time. Where the packet is suspended, it is suspended until the MBR drops down enough due to the elapsed time (during which the average bit rate goes down), or until the load of the interface decreases. Where a packet's priority is less than $PL_a$, it is typically discarded in time sensitive situations, such voice packets.

Essentially, with increasing load ($N/N_{max}$), the allowed priority level $PL_a$ increases and reduces the number of packets that are allowed to be transmitted. Therefore, users with higher established priorities (i.e., higher NBR or due to moderate transmission rates) have a relatively greater chance of having their data packets transmitted successfully. Therefore, those who are willing to pay for a higher NBR receive a higher quality of service. The boundary condition is reached when the number of wireless users reaches its maximum ($N=N_{max}$), wherein the allowed priority should be larger than the highest possible priority level. This prevents new users from entering data packets onto the data channel, so that the signal-to-noise ratio decreases below the minimum level required for existing connections.

In order to obtain an understanding of the invention, the operation of a priority-based quality of service such as SIMA is required. The realization and benefits of a SIMA network may be determined in a manner described herein and in copending U.S. patent application, Ser. No. 08/821,273 entitled "Nominal Bit Rate Network Service", filed on Mar. 20, 1997, which is assigned to the assignee of the instant application, the contents of which are incorporated herein by reference. Nevertheless, a general description of the SIMA nominal bit rate (NBR) concept that is suitable for purposes of the present invention is provided below.

Figure 4:
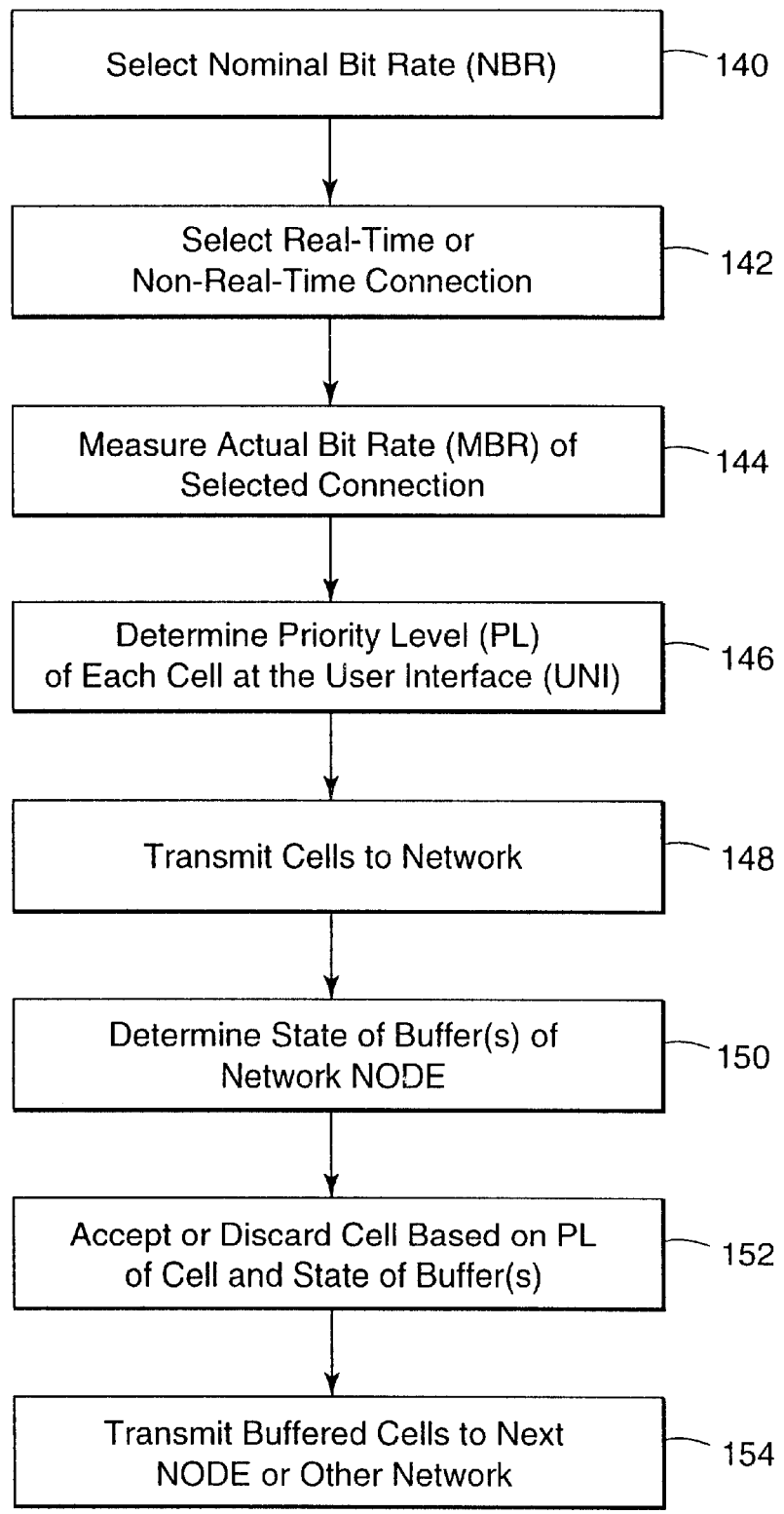
FIG. 4 is a flow diagram illustrating a general procedure for communicating cells of information between a user/network interface and a network using a nominal bit rate service in accordance with the present invention.

Referring now to FIG. 4, there is shown a general methodology for transmitting information between a user/network interface and a network over an NBR service connection. Initially, a user negotiates or selects 140 a nominal bit rate with the network operator, which may be performed prior to, or at the time of, establishing the connection. In one embodiment, the user informs the network operator that a desired NBR is required, and the requested connection bandwidth is allocated to the user. The network operator, in accordance with this embodiment, need not perform the task of analyzing current network load conditions existing at the core network nodes prior to establishing or releasing an NBR connection. In an alternative embodiment, the network operator performs the task of determining network load 15 status prior to establishing or releasing an NBR connection, although this task may not be necessary in a properly dimensioned network supporting an NBR service.

Depending on a particular application, the user selects 142 a real-time or a non-real-time network connection. The process of determining the priority level (PL) of each cell, which indicates the importance or criticality of the cell relative to other cells, involves measuring 144 the actual or measured bit rate (MBR) of the selected real-time or non-real-time connection at the UNI. The priority level of each cell is determined 146 at the UNI. In one embodiment of the invention, a ratio of the MBR and the NBR is used to determine 146 the PL.

After computing the priority level of each cell at the UNI, the cells are transmitted 148 to the network, such as to a node of the network. A network node, upon arrival of a cell transmitted from the UNI, performs a cell filtering process by which the node determines whether to accept or discard a particular cell. The cell filtering process involves determining 150 the state of one or more buffers or memories of the network node to determine a buffer or memory occupancy level. The node accepts or discards 152 a cell based on the priority level of the cell and the state of the node buffer. Cells that meet the filtering criteria determined at the node are accepted, buffered, and eventually transmitted 154 to another node in the network or another network in a manner consistent with the expected quality of service for the connection.

Figure 5:
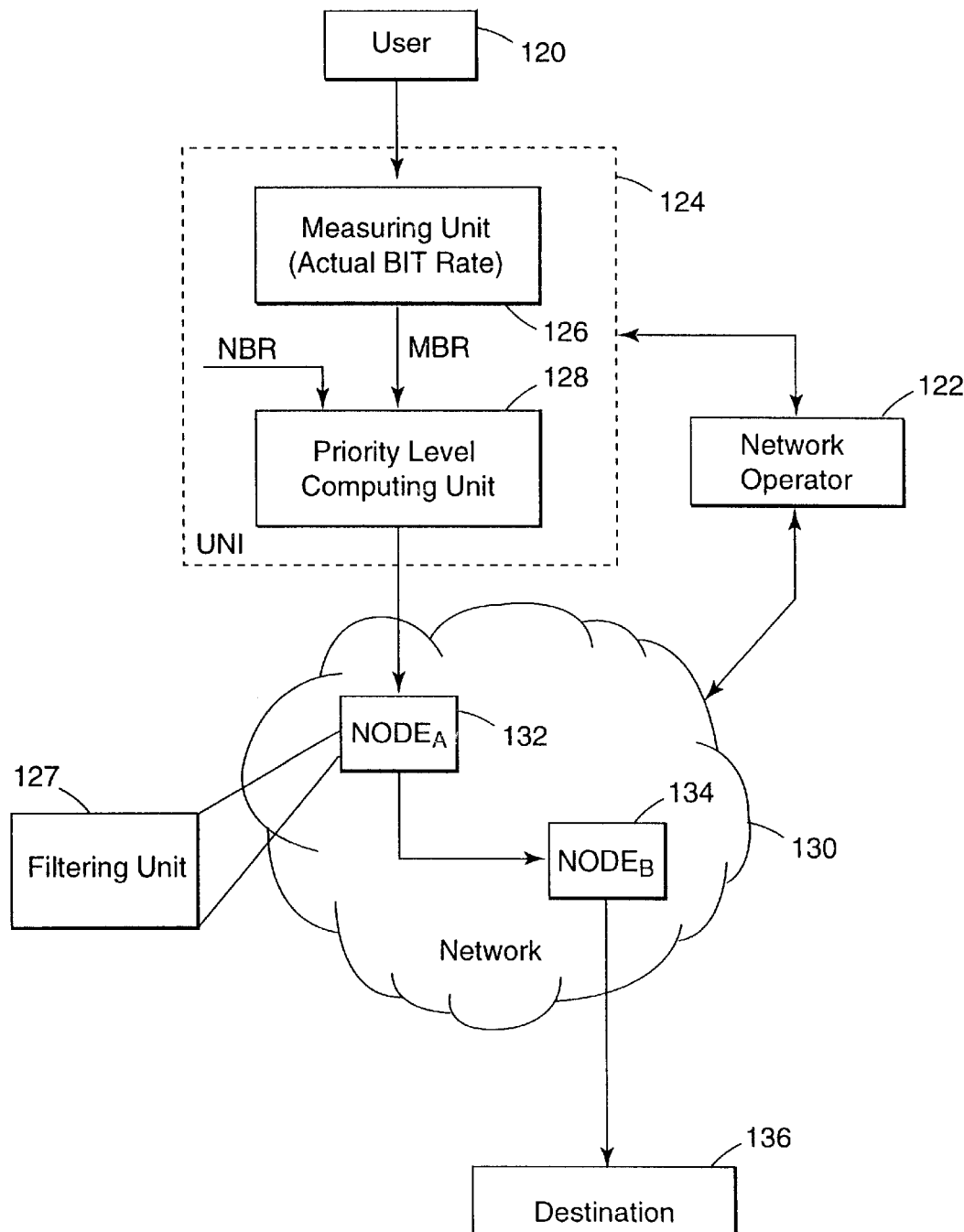
FIG. 5 is a system block diagram of a nominal bit rate service architecture in accordance with the present invention.

Concerning the embodiment illustrated in block diagram form in FIG. 5, there is shown a user 120 that employs a UNI 124 to communicate with a network 130. The user 120 negotiates a nominal bit rate with the network operator 122. The network operator 122 evaluates the user's NBR request based on a number of factors, including the NBR negotiated with other users 120, the number and nature of different connections associated with other users of the network, and other factors affecting network capacity and traffic flow. In principle, NBR can be zero, in which case all cells communicated through the UNI 124 are given lowest priority within the network 130. The value of NBR may also be greater than the transmission capacity at the UNI 124. If the value of NBR is significantly greater than the transmission capacity, for example, all cells transmitted from the UNI 124 are given highest priority within the network 130. It is noted that the priority level of a cell as defined herein has meaning within a network or a number of networks that embraces the NBR service concept. Cells that traverse beyond a network that offers an NBR service, such as by use of an network/network interface (NNI), may be processed in accordance with the traffic management strategy employed by such other network.

In contrast to conventional network services which are designed to provide a guaranteed quality of service, the network operator 122 does not guarantee the continuous availability of the user negotiated NBR. A properly dimensioned network, however, should provide adequate bandwidth to virtually ensure, although not guarantee, the availability of an established NBR. It is noted that all users who are transmitting data with an equivalent NBR encounter approximately the same quality of service.

Having established an NBR with the network operator 122, the user 120 is permitted to communicate information to a desired destination 136 via the network 130. A measuring unit 126 measures the actual or instantaneous bit rate (i.e., MBR) of each cell communicated between the UNI 124 and the network 130. Prior to departure of a cell from the UNI 124, a priority level computing unit 128 determines a priority level for the cell using the negotiated NBR and the MBR. In accordance with one embodiment, one of eight priority levels may be attributed to a given cell. The priority level computing unit 128 determines the priority level of a particular cell by computing a ratio of MBR to NBR. The priority level determined by the computing unit 128 is assigned to the cell which is then transmitted from the UNI 124 to the network 130.

The UNI 124 transmits the cell, which contains priority level information, to a node of the network 130, such as $node_A$ 132. The $node_A$ 132 accepts or discards the cell received from the UNI 124 based on the priority level of the cell and the buffering capacity of $node_A$ 132. In general, as the occupancy of the buffer or memory of $node_A$ 132 increases (i.e., becomes more filled), cells having a lower priority (i.e., higher priority level value) are discarded in favor of accepting cells having a higher priority (i.e., lower priority level value). As the occupancy level of the buffer of $node_A$ 132 decreases (i.e., becomes less filled), the $node_A$ 132 becomes increasingly tolerant toward accepting cells of lower priority (i.e., higher priority level values). Cells that are buffered in $node_A$ 132 are subsequently transmitted to another node in the network 130, such as $node_B$ 134, or other network and, ultimately, to an end-destination 136.

The exemplary network 130 used for purposes of this description is depicted as a network having two intermediary nodes 132 and 134. These nodes represent network data communications elements such as routers, switches and multiplexers. However, as will be appreciated by those skilled in the art, the present invention may likewise be implemented in various multi-node network structures such as multipoint, star, ring, loop and mesh network topologies used in networks ranging from local area networks (LAN) to proliferative global area networks (GAN) such as the Internet.

Figure 6:
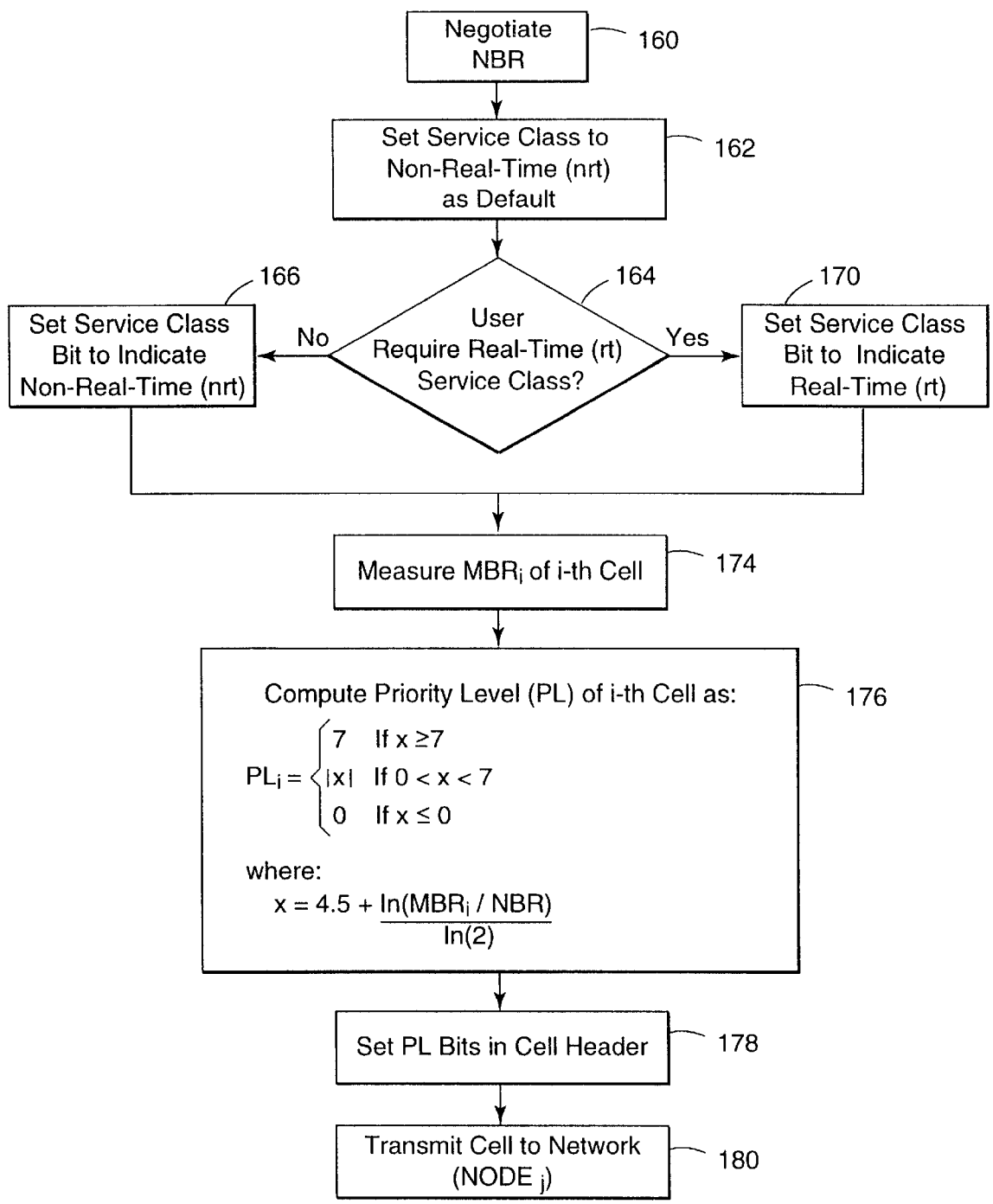
FIG. 6 illustrates in greater detail a procedure for transmitting cells of information between a user/network interface and a network using a nominal bit rate service in accordance with the present invention.
Figure 7:
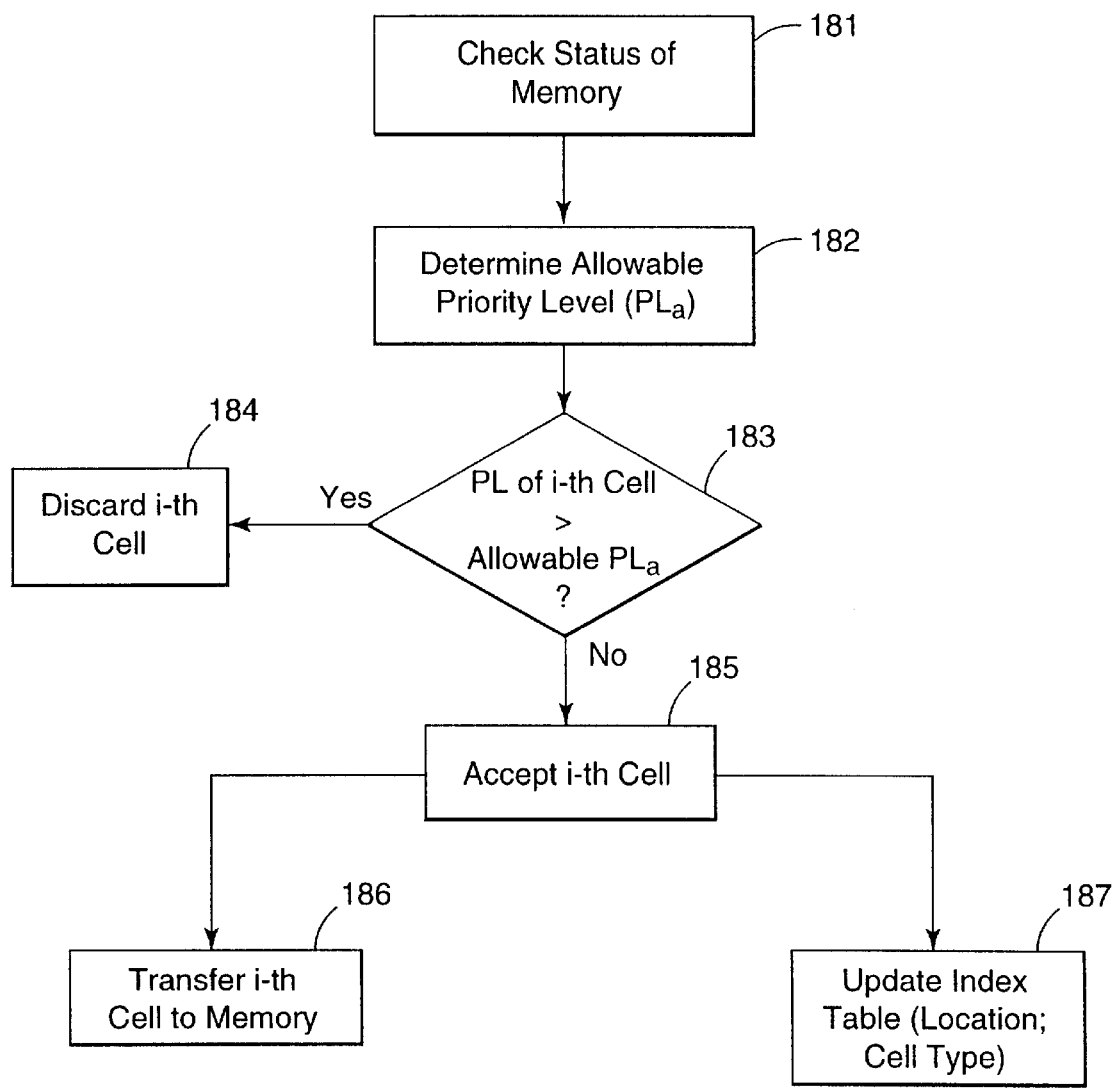
FIG. 7 illustrates in flow diagram form a general procedure for filtering cells at a network node in a nominal bit rate service.
Figure 8:
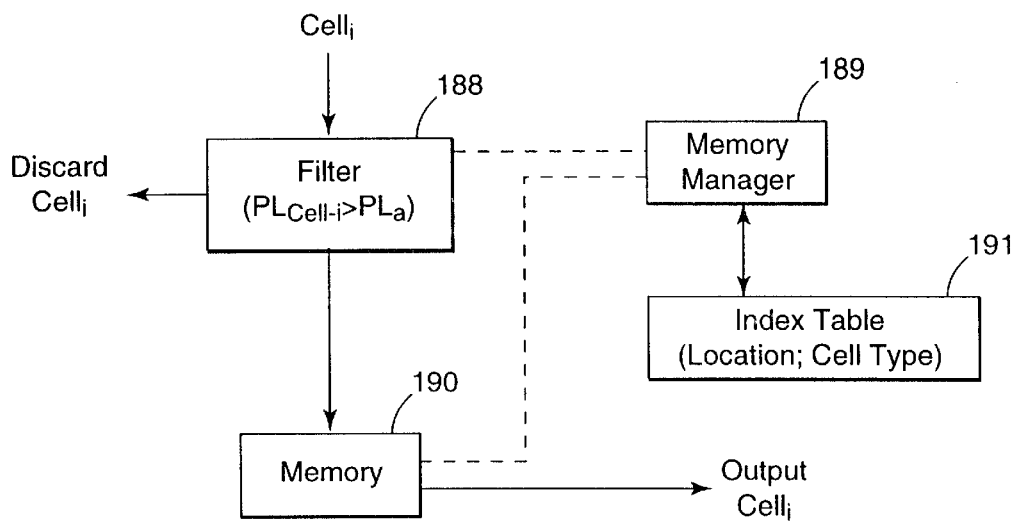
FIG. 8 is a block diagram of an embodiment of a system for filtering cells at a network node in accordance with a nominal bit rate service.

FIGS. 6–8 illustrate a procedure for scheduling and buffering cells in accordance with one embodiment of an NBR service methodology. Referring now to FIG. 6, a user establishes 160 an NBR with a network operator. It may be desirable, although not required, to initially set the service class 162 to a non-real-time (nrt) service class as a default setting. Depending on a particular application, the user may require a real-time (rt) service class 164, which may be set by the user directly or, typically, by the user's application or communications software. If the user requires a real-time connection, each cell transmitted from the user's UNI will have the service class bit in the cell header set to indicate that the payload of the cell contains real-time information 170. It is noted that within the context of a network implemented in accordance with the NBR concept of the present invention, real-time service class connections are expected to support virtually any real-time application without the need to specify particular cell transfer delay (CTD) and cell delay variation (CDV) parameters. As such, the conventional procedure of setting CTD and CDV bits of the cell header to appropriate values to accommodate the real-time service requirements of the connection is altogether obviated.

If the user does not require a real-time service connection, the default non-real-time service class condition remains operative. As such, the rt/nrt service class bit of each cell header is set to indicate that the payload of the cell includes non-real-time information 166. It is noted that the NBR service disclosed herein does not utilize the cell loss priority (CLP) scheme used by conventional ATM traffic management approaches. As such, the CLP bit in the cell header may instead be used to discern between real-time and non-real-time payloads.

In the above described embodiment, each cell transmitted over a connection is designated as either a real-time cell or a non-real-time cell, such as by appropriately setting the rt/nrt service class bit of the cell header. In an alternative embodiment, depending on a user's requirements, a connection may be designated as being either a real-time or non-real-time connection, and the cells communicated over such a connection need not be individually assigned a real-time or non-real-time status. Each node for a given connection, for example, may perform a table look up procedure upon arrival of a cell at the node to determine whether the cell is associated with a real-time or a non-real-time connection. Thus, in accordance with this embodiment, a cell header bit need not be reserved for distinguishing between real-time and non-real-time cells.

After the rt/nrt service class header bit has been set in the above-described manner, the actual bit rate of a particular cell to be transmitted between the UNI and the network is measured 174. Since, in practice, the actual bit rate may be subject to significant variability over time, a measuring unit of the UNI employs an averaging measuring principle to determine the actual or instantaneous bit rate, $MBR_i$.

In general, the UNI measures 174 the actual bit rate of a cell, such as $cell_i$, by approximating the actual or instantaneous bit rate of the connection within a measuring period having a duration that is appropriate for the particular connection (e.g., a real-time or non-real-time connection). The present invention provides for the measurement of the instantaneous bit rate, $MBR_i$.

Having determined 174 the measured bit rate, $MBR_i$, of the i:th cell, the priority level of the i:th cell is computed using the measured bit rate, $MBR_i$, and the nominal bit rate, NBR. In accordance with one embodiment, it is assumed that a cell may be distinguished from other cells using a cell prioritization scheme that employs eight priority levels. In order to indicate which of the eight priority levels is attributed to a particular cell, each cell allocates three bits for this purpose.

In accordance with current ATM specifications, an ATM cell is specified as a unit of transmission having a fixed-size frame consisting of a 5-octet header and a 48-octet payload. It is appreciated that the necessity to allocate three bits in the cell header for the purpose of designating cell priority level may require utilization of currently defined ATM header bits. By way of example, it may be possible to utilize the current Generic Flow Control (GFC) field which constitutes a total of four bits. In this case, three bits may be allocated for designating cell priority level and one bit may be designated as the rt/nrt service class bit. It may be possible, in accordance with another embodiment, to allocate other header bits for the purpose of indicating one of eight priority levels and rt/nrt service class by deviating from the five-octet header ATM specification.

As such, other header bits may be redefined to represent cell priority level and service class designations. Alternatively, one or more bits required to specify cell priority level and/or service class may be situated outside of the currently defined ATM cell header. The need to make a minor modification to the existing ATM cell header definition is significantly offset by the substantial advantages offered by employing the NBR service scheme of the present invention, such as a significant reduction in network and traffic management overhead and complexity.

It is understood that the number of priority levels may be less than eight or greater than eight. By way of example, if it is assumed that four cell header bits are allocated for purposes of indicating a cell's priority level, as many as $2^4$ (i.e., $2^{n\text{-}bits}$) or 16 priority levels may be defined. Increasing the number of priority levels within the context of an NBR service permits the network operator to make finer adjustments to the bandwidth of a particular connection when managing network traffic. The price for this finer level of traffic control is the additional cell header bit or bits needed to resolve a greater number of priority levels.

A priority level computing unit determines 176 the priority level of each cell, such as $cell_i$. In accordance with one embodiment of the present invention, and assuming that the measured bit rate is $MBR_i$ when the i:th cell is transmitted to the network, the priority level ($PL_i$) of $cell_i$ may be calculated using the following equation:

$$x = 4.5 + \frac{\ln(MBR_i/NBR)}{\ln(2)} \quad [1]$$

$$PL_i = \begin{cases} 7 & \text{if } x \geq 7 \\ \lfloor x \rfloor & \text{if } 0 < x < 7 \\ 0 & \text{if } x \leq 0, \end{cases}$$

where, $\lfloor x \rfloor$ represents the integer part of x. The present invention provides for the determination of cell priority levels ($PL_i$) using a buffer-based cell measurement and priority level assignment technique.

As will be discussed hereinbelow in accordance with an embodiment in which both NBR and traditional ATM service connections are accommodated, the zero priority level, PL=0, is reserved for those connections that use an ordinary ATM service with guaranteed bandwidth and quality of service. Accordingly, Equation [1] above may be modified so as to produce cell priority levels ranging between PL=1 and PL=7, such that $\lfloor x \rfloor$ represents the integer part of x, if 1<x<7.

It can be seen by application of Equation [1] above that if a connection is exploiting network capacity in excess to the connection's negotiated NBR value, the priority level of $cell_i$ is at least 4. It can further be seen that if the momentary bit rate at the UNI is less than the negotiated value of NBR, PL is at most 4. The priority level scheme in accordance with this embodiment of the present invention thus permits adjustment of the relative capacity used by a connection in steps of 2. From Equation [1] above, it can be seen that for an NBR of 100 kbit/s, an MBR higher than 566 kbit/sec results in a PL of 7, and an MBR lower than 8.8 kbit/s results in a PL of 0.

The three priority level bits allocated in the cell header are set 178 for each ATM cell transferred from the UNI. The ATM cells are then transmitted 180 to targeted network nodes, identified by node addressing information provided in the cell header.

It is noted that if a user is not satisfied with the quality of service of the connection, the user may elect between at least three alternatives. First, the user may elect to keep the average bit rate unchanging, but reduce the variation of traffic process. Second, the user may elect to decrease the average bit rate, or to increase the nominal bit rate. Increasing the NBR will, however, generally result in a concomitant increase in cost for a higher speed connection. Finally, the user may change the network operator.

In FIG. 7, there is illustrated in flow diagram form a general methodology by which a network node processes cells containing priority level information received from a UNI in accordance with one embodiment of the present invention. FIG. 8 illustrates an embodiment of various components of a network node employed to effectuate the methodology illustrated in FIG. 7. It is assumed that a cell, such as $cell_i$, has been processed at a UNI and includes priority level information derived in a manner described hereinabove.

$Cell_i$ is transmitted from the UNI to a network node and is received at a filter 188 of the node. A memory manager 189 checks the status 181 of the memory 190 in order to determine the occupancy in the memory 190. The memory manager 189 determines 182 the allowable priority level ($PL_a$) based on the occupancy state of the memory 190. In general, the memory manager 189 establishes a high allowable priority which translates to a low allowable priority "level," for example $PL_a$=0 or 2, when the occupancy level of the memory 190 is high (i.e., few available memory locations). When the memory manager 189 determines that the memory 190 has ample capacity for receiving new cells, the memory manager 189 establishes a low allowable priority which translates to a high allowable priority "level," for example $PL_a$=6 or 7. As will be appreciated by those skilled in the art, the calculation of $PL_a$ could alternatively be based on unoccupied buffer capacity rather than on buffer occupancy without departing from the spirit of the invention.

If the priority level of $cell_i$ is greater than the allowable priority level, $PL_a$, as determined 183 by the memory manager 189, the filter 188 discards 184 $cell_i$. If, on the other hand, the priority level of $cell_i$ is equal to or less than the allowable priority level $PL_a$, the filter 188 accepts 185 $cell_i$. The memory manager 189 coordinates the transfer 186 of $cell_i$ to the memory 190 and updates an index table 191 coupled to the memory manager 189 to include a new index table entry for newly accepted $cell_i$. In one embodiment, the index table 191 stores the location of the accepted $cell_i$ in the memory 190, and also stores a cell-type indicator which specifies whether $cell_i$ is a real-time cell or a non-real-time cell. As such, the memory 190 may store both real-time and non-real-time cells.

The memory manager 189, in cooperation with the index table 191, manages cell transfer operations from the memory 190 to the output of the memory 190 by giving preference to the real-time cells over the non-real-time cells. By way of example, the memory manager 189, upon determining the presence of both rt-cells and nrt-cells stored in the memory 190, transfers all of the rt-cells to the output of the memory 190 prior to transferring out any of the nrt-cells.

Figure 9:
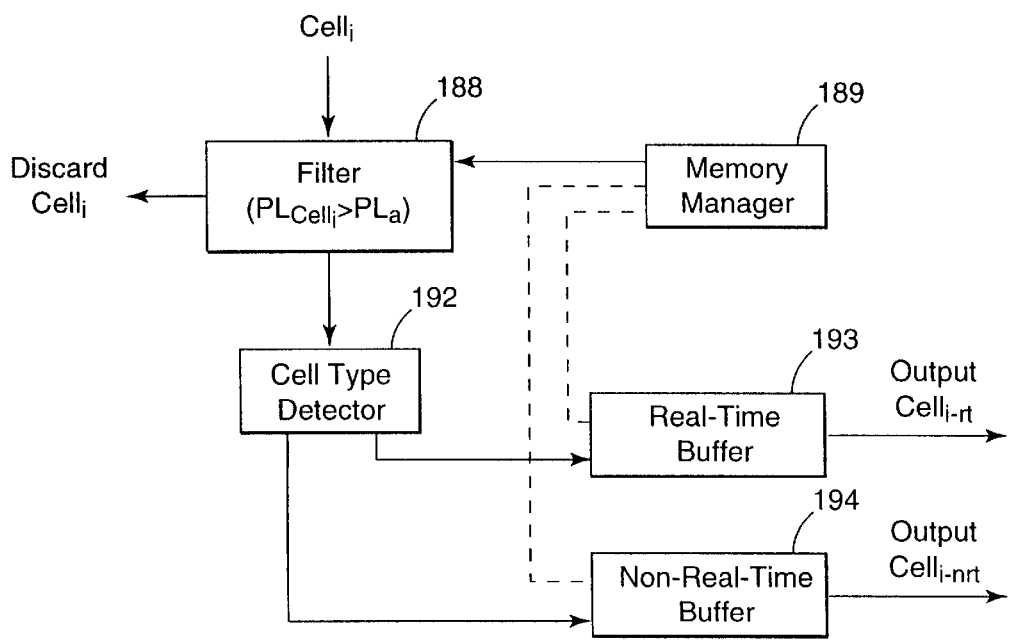
FIG. 9 is a block diagram of an alternative embodiment of a system for filtering cells at a network node in accordance with a nominal bit rate service.

As illustrated in FIG. 9, a memory manager 189 can determine the status of a real-time buffer (rt-buffer) 193 and a non-real-time buffer (nrt-buffer) 194. The memory manager 189 determines, in a manner similar to that previously described, the allowable priority level, $PL_a$, for the filter 188 based on the status of the rt-buffer 193 and the nrt-buffer 194. If the priority level of $cell_i$ is greater than the allowable priority level, $PL_a$, the filter 188 discards $cell_i$. If, on the other hand, the priority level of $cell_i$ is equal to or less than the allowable priority level, $PL_a$, $cell_i$ is accepted.

The network node may apply a buffer filtering scheme which performs the filtering function based on packets of cells, rather than on individual cells. By way of example, the filtering procedure described hereinabove may be applied to the first cell of each packet. If the first cell is discarded by the node, then all of the cells of the packet following the first cell are discarded as well. If, however, the first cell of a packet is accepted, then the priority of all other cells belonging to that packet may be increased, for example by changing the priority level from PL=5 to PL=3. A gain of even one priority level, such as from PL=4 to PL=3, is believed to be sufficient to ensure that there will only be very few partially transmitted packets.

A cell-type detector 192 receives the accepted cell, $cell_i$, from the filter 188 and determines whether $cell_i$ is an rt-cell or an nrt-cell. As discussed previously, the header of $cell_i$ includes a header bit, such as the CLP bit, which indicates whether or not $cell_i$ is an rt-cell or an nrt-cell. The cell-type detector 192, upon determining the service class type of the $cell_i$, transfers the $cell_i$ to either the rt-buffer 193 or the nrt-buffer 194. In a manner similar to that described previously with respect to FIGS. 7 and 8, the memory manager 189 coordinates the output of rt-cells and nrt-cells respectively from the rt-buffer 193 and the nrt-buffer 194, giving preference to the rt-cells.

It may be desirable, for purposes of enhancing network expansion and traffic control, to request that each user of the network purchase a maximum NBR. The maximum NBR value is intended to remain substantially constant. In addition, it may be desirable to request that each user select an appropriate instantaneous NBR, which should be no greater that the selected maximum NBR. The selection of an appropriate instantaneous NBR generally involves a compromise between price and quality of service. The service quality detected by a user depends largely on three parameters, namely the NBR, the average bit rate, and the amount of traffic variations. Although a user may change any of these parameters, the only information that the network needs to know at the initiation of cell transmission is the NBR and the service class (real-time or non-real-time) of the connection.

A SIMA service which provides for both NBR and traditional ATM services requires that the network operator dedicate a UPC device for each conventional ATM connection, or possibly for each virtual path. All of the cells transmitted using traditional ATM service connections are designated with the highest priority of PL=0 and with a real-time (rt) service class designation. In accordance with this approach, the zero priority level is reserved for those connections that use an ordinary ATM service with guaranteed bandwidth and quality of service. Accordingly, the priority determination Equation [1] above is modified so as to produce cell priority levels ranging between PL=1 and PL=7, such that $\lfloor x \rfloor$ represents the integer part of x, if 1<x<7. It is noted that if the network operator wants to mark excessive cells as CLP=1 cells, those cells may be marked with a lower priority, such as PL=6, for example.

A point of possible incompatibility with traditional ATM technology involves the necessity of three bits for each ATM cell for the determination of cell priority, or two bits if the current cell loss priority, CLP, bit in the cell header is used. In addition, one bit is needed to distinguish between real-time and non-real-time connections. The rt/nrt service bit may be, but is not required to be, included in every cell. It may be possible to utilize the current Generic Flow Control (GFC) field which constitutes a total of four bits. In this case, three bits may be allocated for designating cell priority level and one bit may be designated as the rt/nrt service class bit.

While the implementation of SIMA networks as described above is directed to distributed networks such as the Internet, the present invention applies the principals of SIMA to the allocation of radio resources for data packets in other communications systems, such as a CDMA communications system. The present invention addresses these issues, and is described below in connection with a CDMA-based communication system that transmits packets of data. As will become increasingly clear from the ensuing description, this is especially advantageous for use in third generation mobile cellular networks. Upon analysis of the following description, those skilled in the art will appreciate that the principles of the present invention can be applied to other packet-based data communications, such as local area networks (LANs), communications between mobile stations, and other network systems that may utilize a CDMA communications interface. The following exemplary embodiments are therefore provided for illustrative purposes, however the present invention is not limited thereto.

The following diagrams provide various implementation embodiments in accordance with the present invention. In these embodiments, a cellular network is used to illustrate the principles of the invention. It is also assumed for purposes of the following description that the transmission uplink (Mobile Station to Base Transceiver Station) and transmission downlink (Base Transceiver Station to Mobile Station) are operating at different frequency bands. However, it is also possible that transmission can occur in both directions in a common frequency channel.

Figure 10:
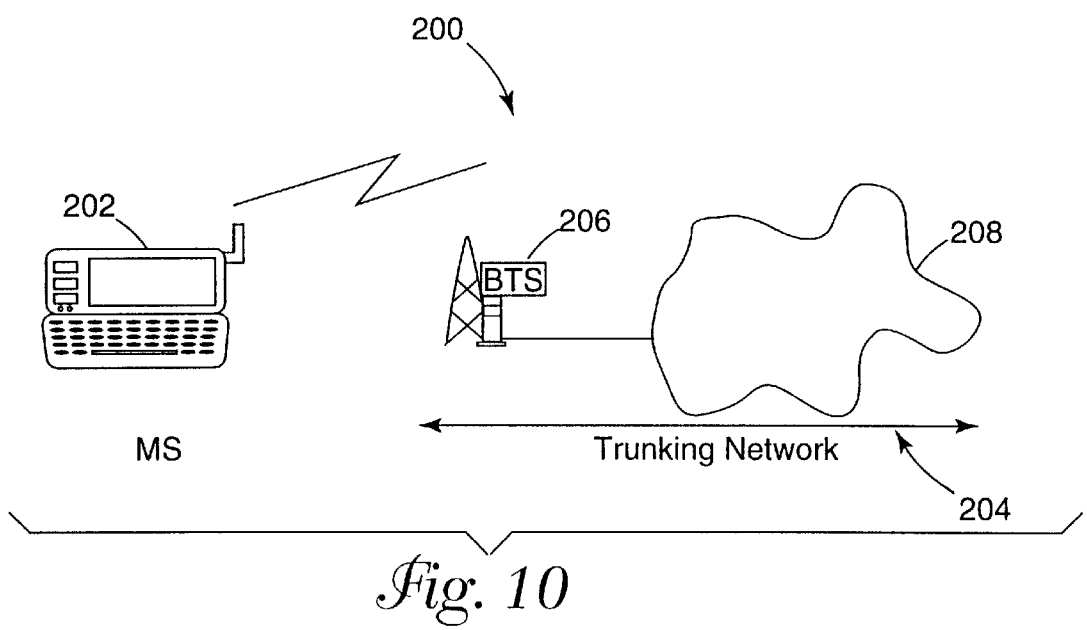
FIG. 10 illustrates an exemplary CDMA cellular network capable of incorporating the present invention.

Referring now to FIG. 10, a CDMA cellular network 200 capable of incorporating the present invention is illustrated. A portable computing device 202 represents a Mobile Station (MS) which is capable of communicating information to and from the trunking network 204. The tunking network 204 typically includes a Base Transceiver Station (BTS) 206 and other components of the fixed cellular network 208. Data packets are transmitted between the MS 202 and the trunking network 204 using CDMA technology enhanced by the priority principles of the present invention.

Figure 11:
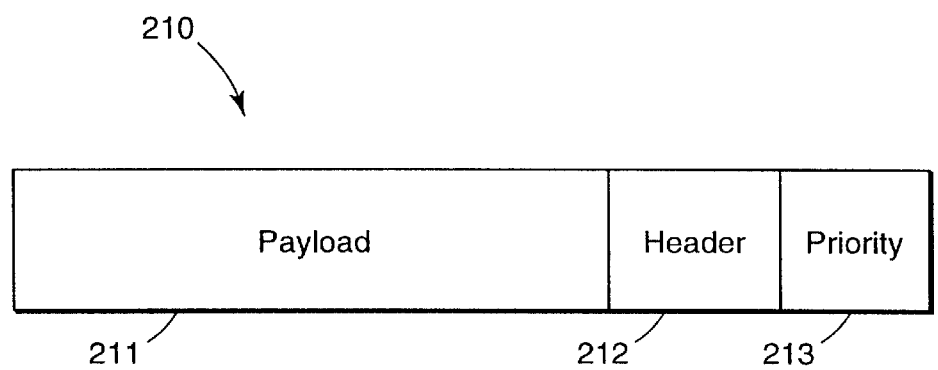
FIG. 11 illustrates an example of a data packet that includes at least a portion of the data to be transmitted between the mobile station and the network.

FIG. 11 illustrates an example of a data packet 210 that includes at least a portion of the data to be transmitted between the MS and the network. The packet 210 includes a payload portion 211 representative of the data to be transmitted. The payload may be accompanied by some type of header 212 that provides protocol control information. In accordance with the present invention, cell priority bits are provided in priority field 213 in addition to, or alternatively as an integral part of, a header field 212.

Figure 12:
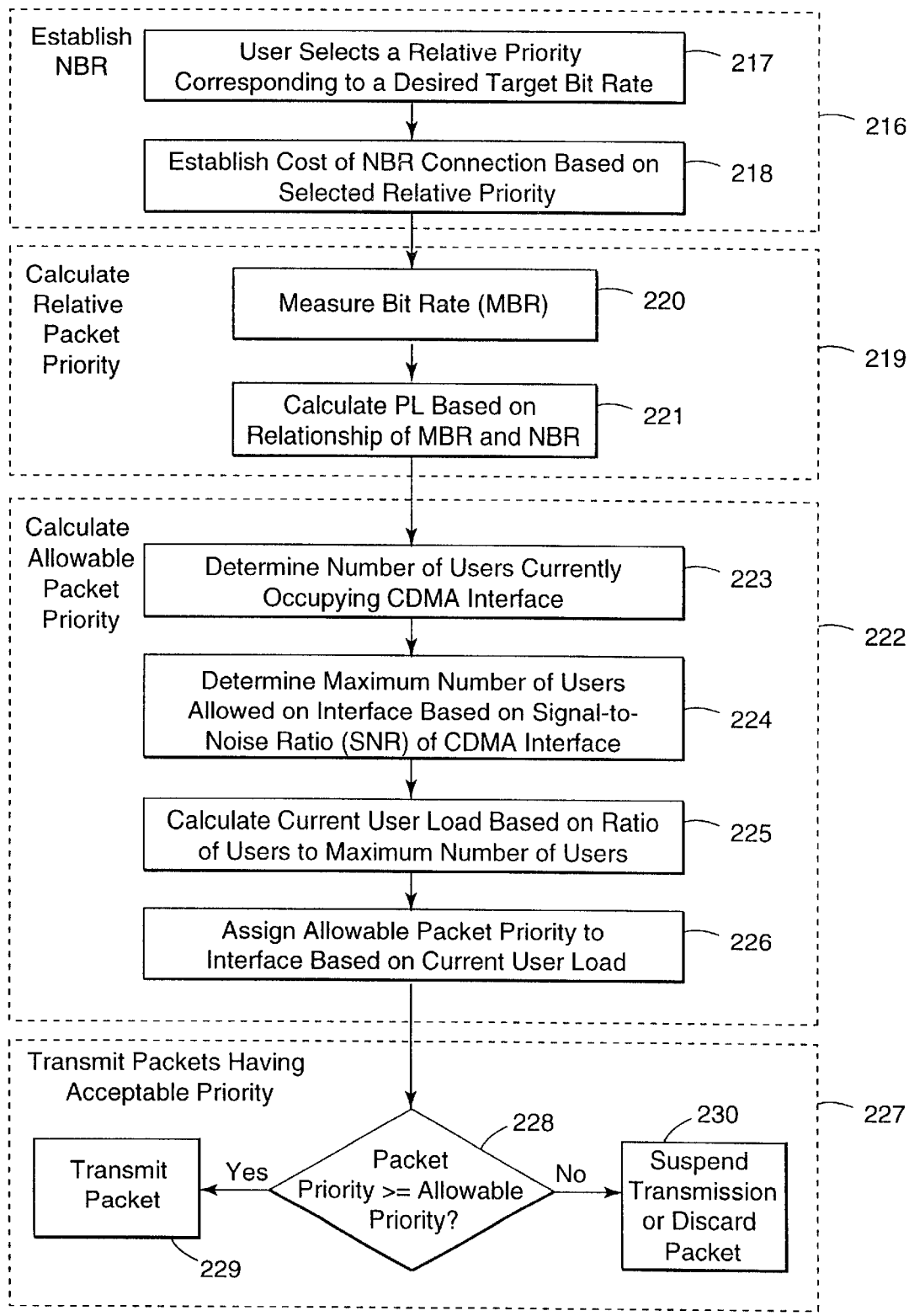
FIG. 12 is a flow diagram of one embodiment of a process for selectively allocating data packet transfers over a wireless interface operating under a CDMA protocol in accordance with the present invention.

FIG. 12 is a flow diagram of one embodiment of a process for selectively allocating data packet transfers over a wireless interface operating under a CDMA protocol in accordance with the present invention. A general process is depicted by dashed blocks, and a more detailed example process is incorporated into the more general process for illustrative purposes.

The present invention includes establishing 216 a nominal bit rate (NBR). It is this parameter that defines the quality of service provided the particular user. In one embodiment, the user selects 217 a relative priority corresponding to a desired target bit rate, which corresponds to the established NBR. The cost of this connection is established 218 based on the selected relative priority. For example, selection of a high priority NBR will be priced higher than a relatively lower priority NBR.

A relative priority is then calculated 219. In one embodiment of the invention, this involves measuring 220 the bit rate (MBR) to determine the instantaneous, actual bit rate at the CDMA interface, and calculating 221 the priority level (PL) which will be assigned to the corresponding data packets. The PL is based on a relationship between the MBR and the NBR, as will be discussed in more detail below.

The calculation of the MBR may be performed in accordance with bit measurement schemes known in the art. Further, a moving average method may be used. At the arrival of the i-th data packet, it is possible to use Equations [2] and [3] below. First, a load ρ is calculated using Equation [2]:

$$\rho_{i,j} = (1-\alpha)\frac{\Delta t_{i,j}}{L_{i,j}}\rho_{i,j-1} + \alpha \quad [2]$$

where $\Delta t_{ij}$ is the time between data packets j and j−1 of the connection i, α is a parameter that defines the time constant of the measurement, and $L_{ij}$ is the length of the data packet j. This defines the load that is then used with the following equation for determining the measured bit rate:

$$MBR_{i,j} = \frac{C\ln(1-\alpha)}{\ln\left(1-\frac{\alpha}{\rho_{i,j}}\right)} \quad [3]$$

In another embodiment, a measuring scheme for use with variable length packets is provided by Equation [4] below. A variable for each class, real-time ($M_1$) and non-real-time ($M_2$) packets, is updated each time a new packet j is presented to the interface:

$$M_k(j) = M_k(j-1)\cdot e^{-\Delta t/\tau_k} + \begin{cases} S(j)/\tau_k & R(j)=k \\ 0 & R(j)\neq k \end{cases} \quad [4]$$

where: j indicates the packet number; S(j) represents the size of the packet j (e.g., in bytes); R(j) is the delay class of the packet (e.g., 1 for real-time and 2 for non-real-time), Δt is the time duration between packets j−1 and j (e.g., in milliseconds); and $\tau_k$ is the measuring period of delay class k (e.g., in milliseconds). In addition, a common variable is provided that measures the entire load of all delay classes ($M_0$), which can provided by the following equation:

$$M_0(j) = M_0(j-1)\cdot e^{-\Delta t/\tau_0} + S(j)/\tau_0 \quad [5]$$

Constant $\tau_0$ could be relatively long compared to $\tau_0$ and $\tau_2$. For example, $\tau_0=1$ second, $\tau_1=5$ milliseconds, and $\tau_2=50$ milliseconds. The measured rate (in kbits/s) when the packet arrives is then provided by Equation [6] below:

$$MBR(j) = 8\cdot(\beta_0\cdot M_0(j) + (1-\beta_0)\cdot M_{R(j)}(j)) \quad [6]$$

where $\beta_0$ is the weighting constant for common measurement ($M_0$), $0\leq\beta_0\leq 1$ (e.g., 0.5). $\beta_0$ needs to be large enough, otherwise a user would get extra benefit from sending packets to several delay classes at the same time. Equation [6] can be applied to as many delay classes as needed.

The packet priority currently allowed on the CDMA interface is then calculated, as seen at block 222. In one embodiment, this calculation is accomplished by determining 223 the number of users currently using the interface, and determining 224 the maximum number of users allowed on the interface. The maximum number of users allowed is based on the signal-to-noise ratio (SNR) of the CDMA interface. When a number of concurrent users would cause the noise in the common CDMA channel to prohibit satisfactory transmission of the desired signal, the number of users is excessive. In this case, the maximum number of users ($N_{max}$) must be set below this threshold such that the SNR is not prohibitively elevated.

The load of the CDMA connection is calculated 225 based on the ratio of users to the maximum number of users allowed. An allowable packet priority for the CDMA interface is assigned 226 such that any data packets meeting this allowable priority threshold will be allowed to access the wireless interface. Packets including such an acceptable priority are therefore transmitted 227 via the wireless interface. In one embodiment, this decision involves comparing 228 the packet priority to the allowable packet priority of the interface. Where the packet priority is greater than or equal to the allowable priority the packet is transmitted 229; otherwise it is not. Where the packet is not transmitted, the transmission can be temporarily suspended, or the packet can be discarded as seen at block 230.

The invention thus provides for the measurement of an actual, or "measured" bit rate (MBR), determination of a priority level PL using the ratio of the MBR to the established NBR, and acceptance or suspension (or discarding) of the packet depending on the load of the CDMA interface. In a first embodiment of the invention, a "centralized" implementation is described, wherein these cell priority functions are centrally located in the network portion of the system, such as the trunking network in the present example.

Figure 13A:
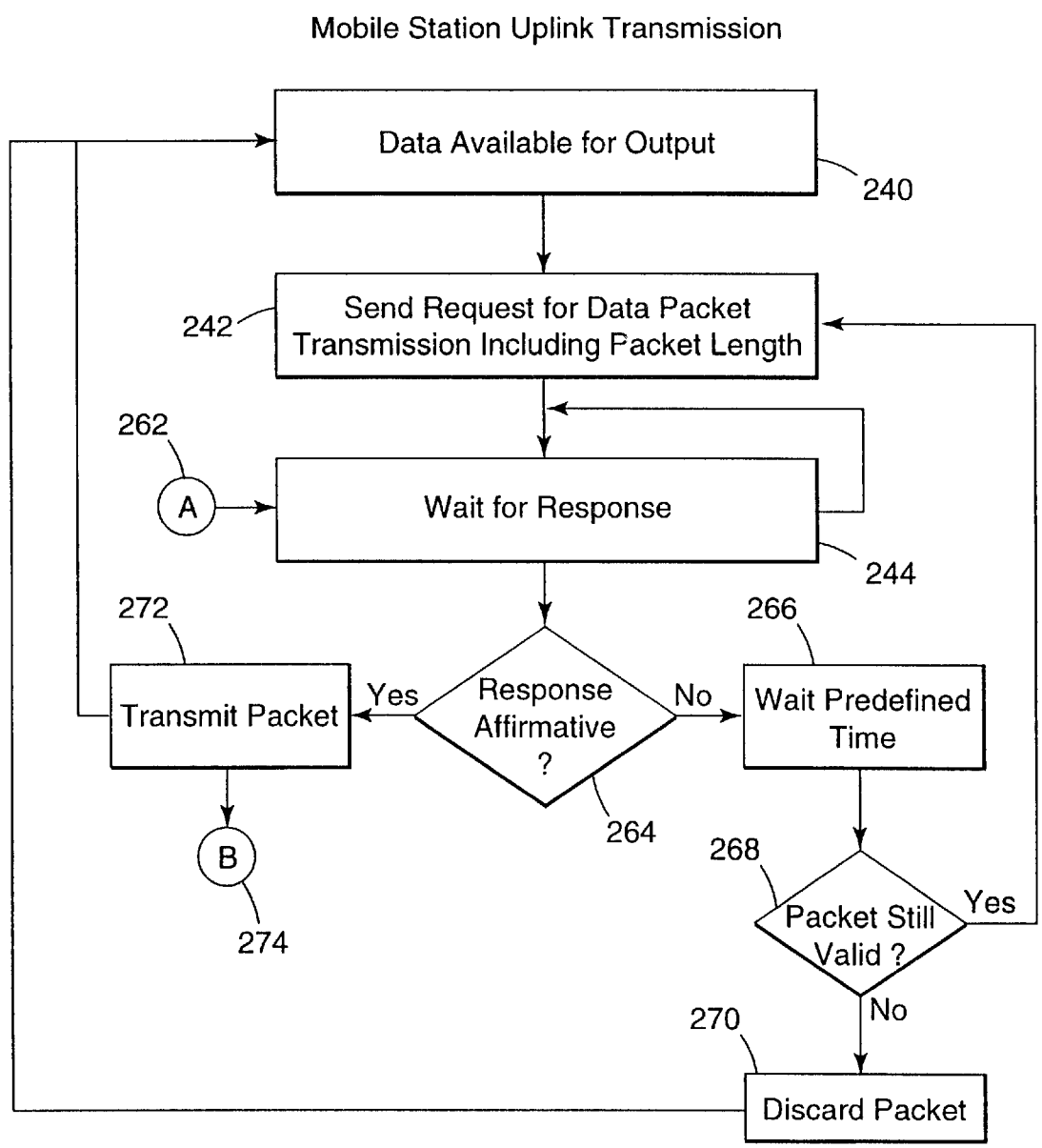
FIGS. 13A and 13B are flow diagrams illustrating one manner of providing CDMA-transmitted data packets in the uplink direction (MS to BTS) in a centralized, priority-based, packet management system in accordance with the present invention.
Figure 13B:
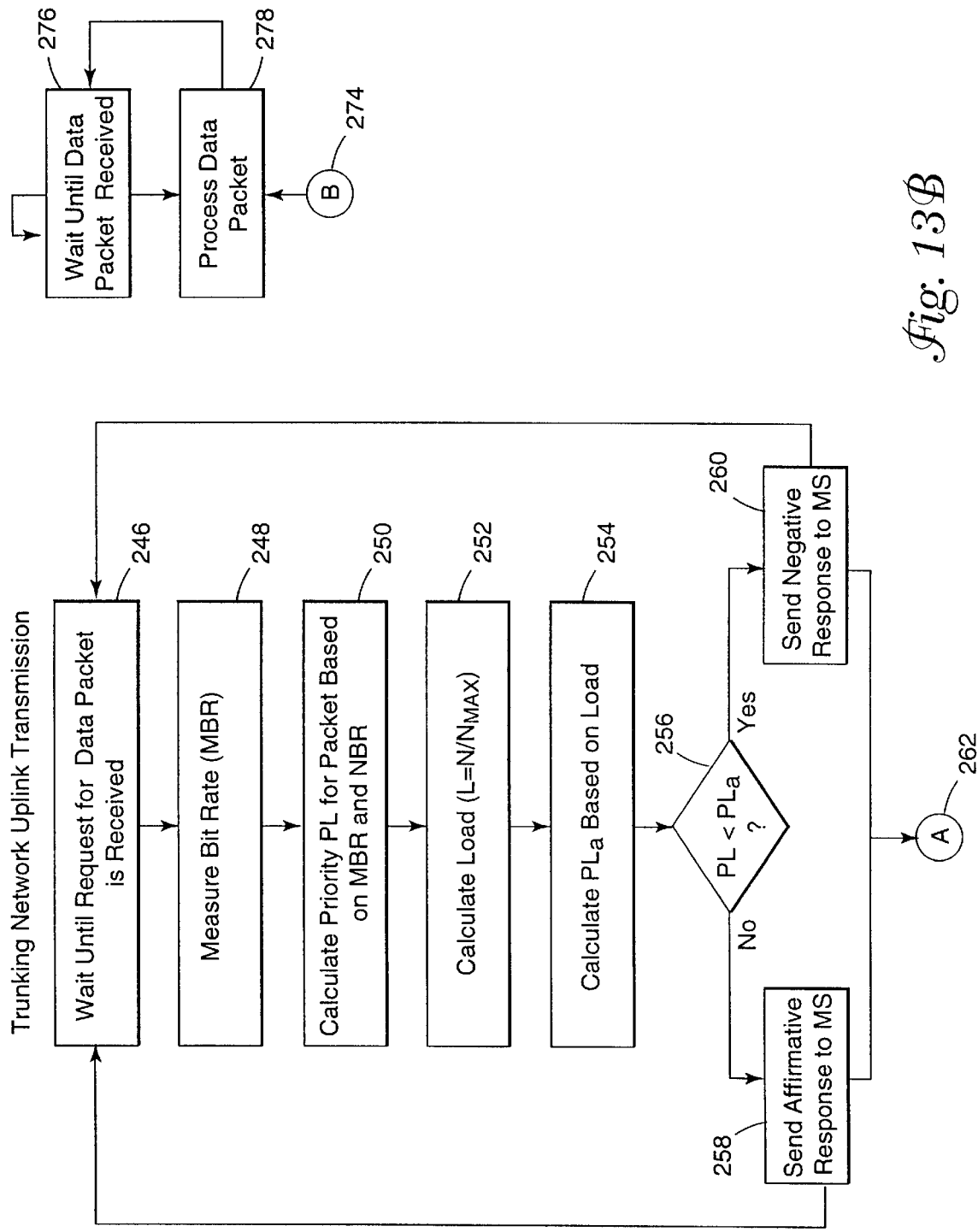

FIGS. 13A and 13B are flow diagrams illustrating a manner of providing CDMA-transmitted data packets in the uplink direction (MS to BTS) in a centralized, priority-based, packet management system. In this embodiment, the BTS incorporates the required priority analysis functionality (e.g., SIMA functionality).

Referring first to FIG. 13A, a flow diagram is provided that illustrates the activity at the MS for uplink transmissions in a centralized implementation. The MS waits until there is data available for output transmission, as seen at block 240. When data is ready to be output, the MS transmits 242 a request to the trunking network requesting a data transfer. The data packet being transmitted may be of a fixed or variable length, and in the case of variable length packets, the request may include an indication of the length of the data packet to be transmitted. This indication can be accomplished using an indication message sent in a signalling channel.

In one embodiment of the invention, the length of the packet is sent to the trunking network so that in the centralized implementation, the network element, such as the BTS, can calculate the MBR. This facilitates one goal of the centralized scheme, which is to centrally locate SIMA functions and calculations, and furthermore, other necessary information such as the number of users, the S/N ratio, etc. is already present at the trunking network portion.

Block 244 indicates that the MS will wait to receive a response from the trunking network with respect to whether or not the data packet may be transmitted. The MS transmissions are therefore suspended until the trunking network authorizes the data packet to be transmitted, whereby the authorization dependent upon the load conditions of the CDMA interface.

Turning now to FIG. 13B, the trunking network waits 246 until a request for packet transmission is received from the MS. The bit rate at the trunking network is measured 248 to determine the instantaneous actual bit rate of the connection. The measurement of a connection's actual bit rate may be accomplished as previously described in connection with the SIMA system, or may alternatively be determined in other manners known in the art without departing from the scope and spirit of the invention.

The priority level PL for the particular packet is then calculated 250 at the trunking network based on the relationship between the MBR and the established NBR. The number of priority levels used depends on the priority variation desired by the user, and on the number of bits available to store the priority level. In one embodiment of the invention, one of eight priority levels may be attributed to a given cell. A priority level computing unit such as a processing device, arithmetic logic unit, or the like determines the priority level of a particular cell by computing the ratio of MBR to NBR. Such a computation was previously described in connection with Equation [1].

The connection load is then computed 252 using the following equation:

$$L = N/N_{max} \quad [7]$$

where L represents the load, N represents the current number of users occupying the CDMA connection, and $N_{max}$ represents the maximum number of users allowed for the CDMA connection. Using the load of the CDMA interface, the allowed priority level $PL_a$ can be determined 254. One manner of calculating the $PL_a$ includes dividing the total number of potential users into various ranges, where each range corresponds to a particular allowed priority level. This is illustrated in Table [1] below, assuming eight priority levels:

TABLE 1

| CDMA CONNECTION LOAD | ALLOWED PRIORITY LEVEL |
|---|---|
| 0:L/7 | 7 |
| L/7:2L/7 | 6 |
| 2L/7:3L/7 | 5 |
| 3L/7:4L/7 | 4 |
| 4L/7:5L/7 | 3 |
| 5L/7:6L/7 | 2 |
| 6L/7:1 | 1 | where a lower "allowed priority level" value correlates to heavier load conditions, and allows only higher priority data packets to be transmitted. It should be recognized that while the allowed priority levels listed above are determined by way of a linear division of the number of users, this is not required.

Another example of calculating the $PL_a$ includes the following equation:

$$PL_a = Int\left[8\left(1 - \frac{N}{N_{max}}\right)\right] = Int[8(1-L)] \quad [8]$$

which divides the load L into eight ranges and yields corresponding $PL_a$ values. "Int" indicates that the integer portion of the value is retained. It should be recognized that this type of equation can be applied to any desired number of allowed priority level ranges.

When the allowed priority level of the CDMA connection and the priority level of the particular data packet have been determined, a comparison 256 is made to determine whether the priority level (PL) of the data packet is less than the allowed priority level ($PL_a$) of the CDMA connection. In this example, a lower priority level "value" represents a higher priority (e.g., PL=0 represents highest packet priority, PL=7 represents lowest packet priority). If PL is not less than $PL_a$ (i.e., PL is greater than or equal to $PL_a$), this indicates that the data packet will be allowed on the CDMA interface, and an affirmative response is sent to the mobile station as depicted at block 258. Where PL is less than $PL_a$, this indicates that the data packet will not be allowed on the CDMA interface, and a negative response is sent to the mobile station as depicted at block 260. The trunking network continues to monitor for other data packets as indicated by the return lines from blocks 258, 260 to block 246. It should, however, be recognized that various steps of this flow diagram can be effected in parallel.

Either an affirmative or negative response is sent to the mobile station, as indicated by link "A" 262 of FIG. 13B. Returning to FIG. 13A, link "A" 262 provides the response to the mobile station's request for the data packet transmission. As previously described, the MS will wait to receive a response from the trunking network with respect to whether or not the data packet may be transmitted as seen at block 244. When either an affirmative or negative response has been provided, the mobile station determines 264 whether the response was an affirmative response, and if not, the system optionally waits a predetermined period of time as seen at block 266. This waiting period may be fixed, random, or based on a predetermined algorithm. This optional suspension of activity continues until the measured bit rate drops enough due to the elapsed time (during which the average bit rate decreases), or until the load of the radio interface decreases. If the packet has not become obsolete and is therefore still valid as determined at block 268, the request is again sent 242. Where the data is time sensitive and therefore is no longer valid following the predetermined time period, the packet is discarded 270. An example of such a time sensitive data packet is a voice packet that, after expiration of one or more of the predetermined time periods, should no longer be transmitted.

Where it is determined 264 that the trunking network provided an affirmative response, the packet is transmitted 272 to the trunking network. This is illustrated via links "B" 274 of FIGS. 13A and 13B. FIG. 13B illustrates in block 276 that the trunking network waits to receive data packets following its transmission of an affirmative response to the mobile station's request for data transmission. When the data is received 276 at the trunking network, the data packet is processed 278 to complete the data packet transfer.

Figure 14A:
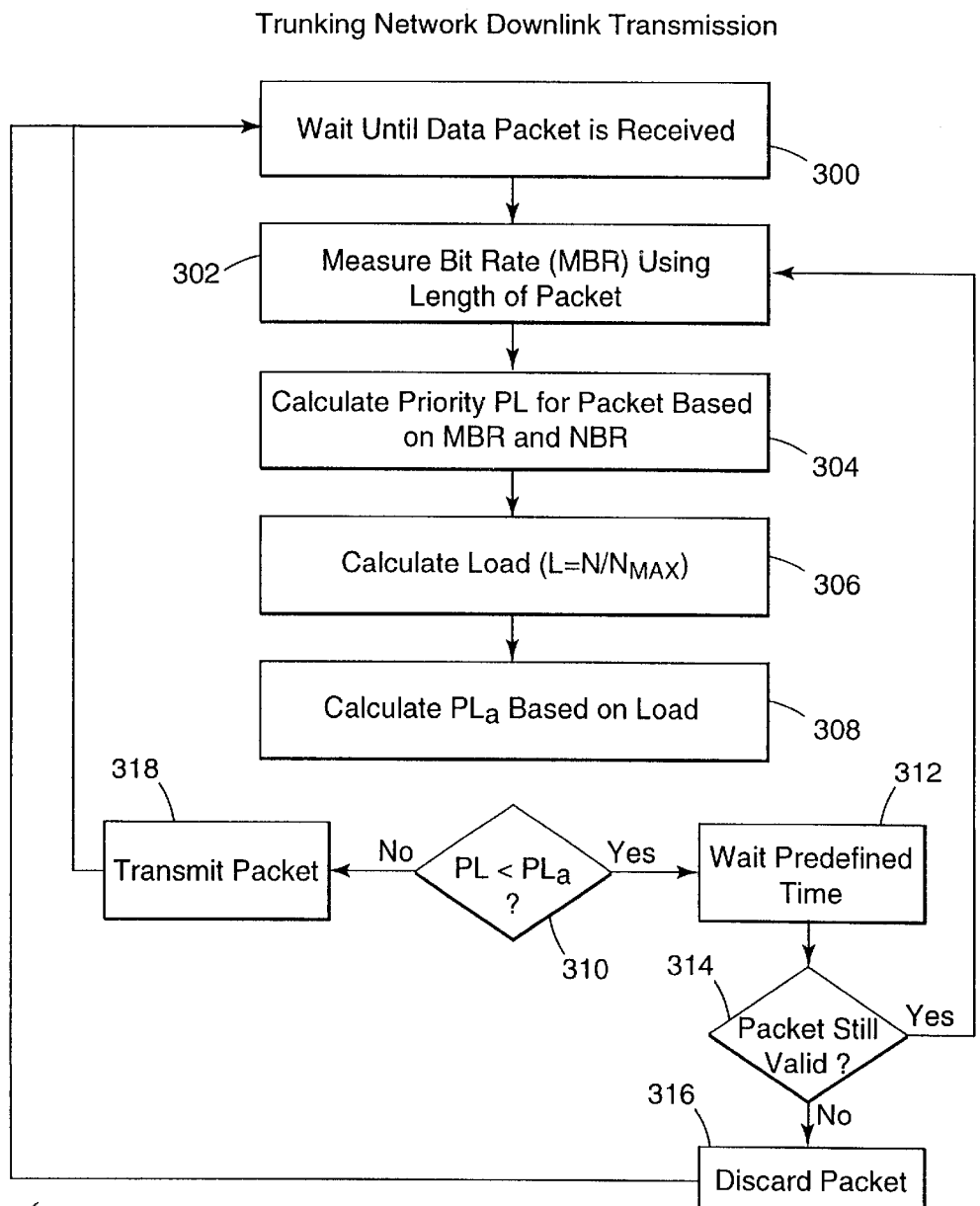
FIGS. 14A and 14B are flow diagrams illustrating one manner of providing CDMA-transmitted data packets in the downlink direction (BTS to MS) in a centralized, priority-based, packet management system in accordance with the present invention.
Figure 14B:
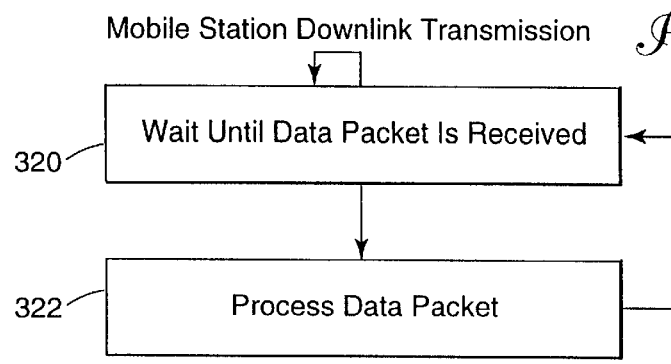

FIGS. 13A and 13B illustrated a manner of providing CDMA-transmitted data packets in the uplink direction (MS to BTS) in a centralized, priority-based, packet management system. FIGS. 14A and 14B illustrate the downlink transmission (BTS to MS) in a centralized, priority-based, packet management system in accordance with the present invention. In the centralized implementation of FIGS. 14A and 14B, there is no need for signaling between the MS and BTS as was required in the uplink direction, because all of the functions are performed in the trunking network. Therefore, in the case of a downlink transmission in a centralized system of the present invention, the MS simply monitors the traffic channel and receives packets when transmitted by the trunking network. The centralized implementation therefore involves a trunking network which implements priority-based packet functions, such as the priority functionality provided by a SIMA system, where the mobile station makes transmission requests and transmits data on the CDMA interface only when permitted.

Referring now to FIG. 14A, a flow diagram is provided which illustrates the activity at the trunking network for downlink transmissions in a centralized implementation. The trunking network waits 300 until a data packet is received which is to be transmitted to the MS. The MBR of the connection is measured 302 using the length of the packet to determine the instantaneous actual bit rate of the connection. Manners of calculating the MBR have been previously discussed.

The priority level PL for the particular packet is calculated 304 at the trunking network based on the relationship between the MBR and the established NBR, as previously described. The connection load is again calculated 306 using Equation [7] above, where L represents the load, N represents the current number of users occupying the CDMA connection, and $N_{max}$ represents the maximum number of users allowed for the CDMA connection. Using the load of the CDMA interface, the allowed priority level $PL_a$ can be calculated 308.

When the allowed priority level of the CDMA connection and the priority level of the particular data packet have been determined, a comparison 310 is made to determine whether the priority level (PL) of the data packet is less than the allowed priority level ($PL_a$) of the CDMA connection. If PL is less than $PL_a$ (i.e., PL is greater than or equal to $PL_a$), the data packet is not allowed on the CDMA interface, and the system optionally waits 312 a predetermined period of time, whether fixed, random, or based on a predetermined algorithm. This optional waiting period continues until the measured bit rate drops enough due to the elapsed time (during which the average bit rate decreases), or until the load of the radio interface decreases. If the packet has not become obsolete and is therefore still valid as determined at block 314, the bit rate is again measured 302 to ultimately determine 310 whether the packet can be transmitted. Where the data is time sensitive and therefore is no longer valid following the predetermined time period, the packet is discarded 316. Where PL is not less than $PL_a$, the data packet is transmitted 318.

FIG. 14B is a flow diagram illustrating the activity at the mobile station for downlink transmissions in a centralized implementation. For downlink transmissions in a system having priority functions centralized in the trunking network, no signaling between the MS and the trunking network (BTS) is required. The MS simply waits 320 until a data packet is received, and processes 322 the data packet accordingly.

In another embodiment of the invention, a "distributed" implementation is described, wherein the cell priority functions are distributed between the trunking network and the mobile station. Where the priority-based acceptance of packets is based on SIMA principles, the MS attempts to perform as many SIMA functions as possible rather than performing all of the SIMA functions at the trunking network as in the case of the centralized implementation. One primary advantage of the distributed implementation is the reduction in signaling messages between the MS and the trunking network.

Figure 15A:
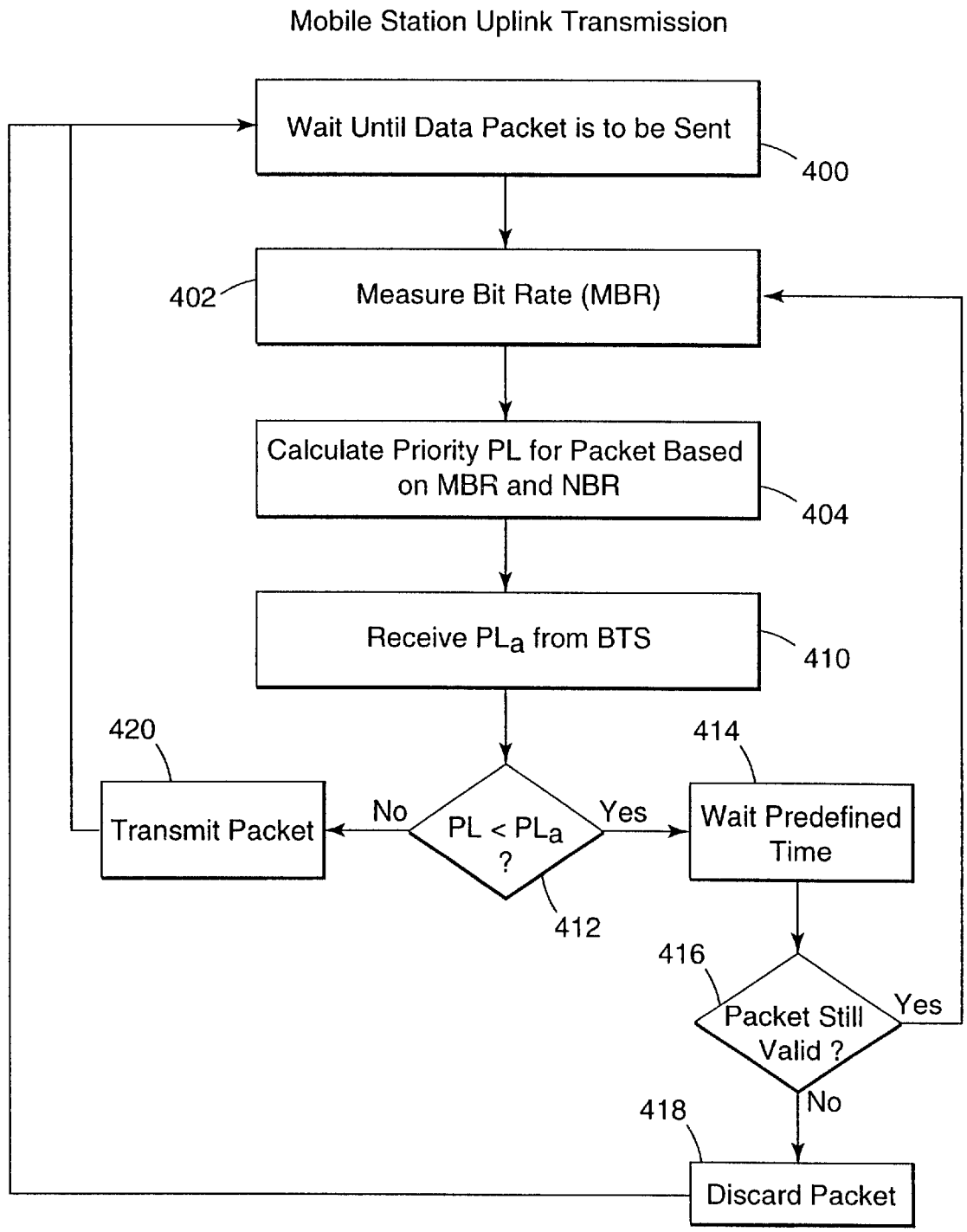
FIGS. 15A and 15B are flow diagrams illustrating one manner of providing CDMA-transmitted data packets in the uplink direction (MS to BTS) in a distributed, priority-based, packet management system in accordance with the present invention.
Figure 15B:
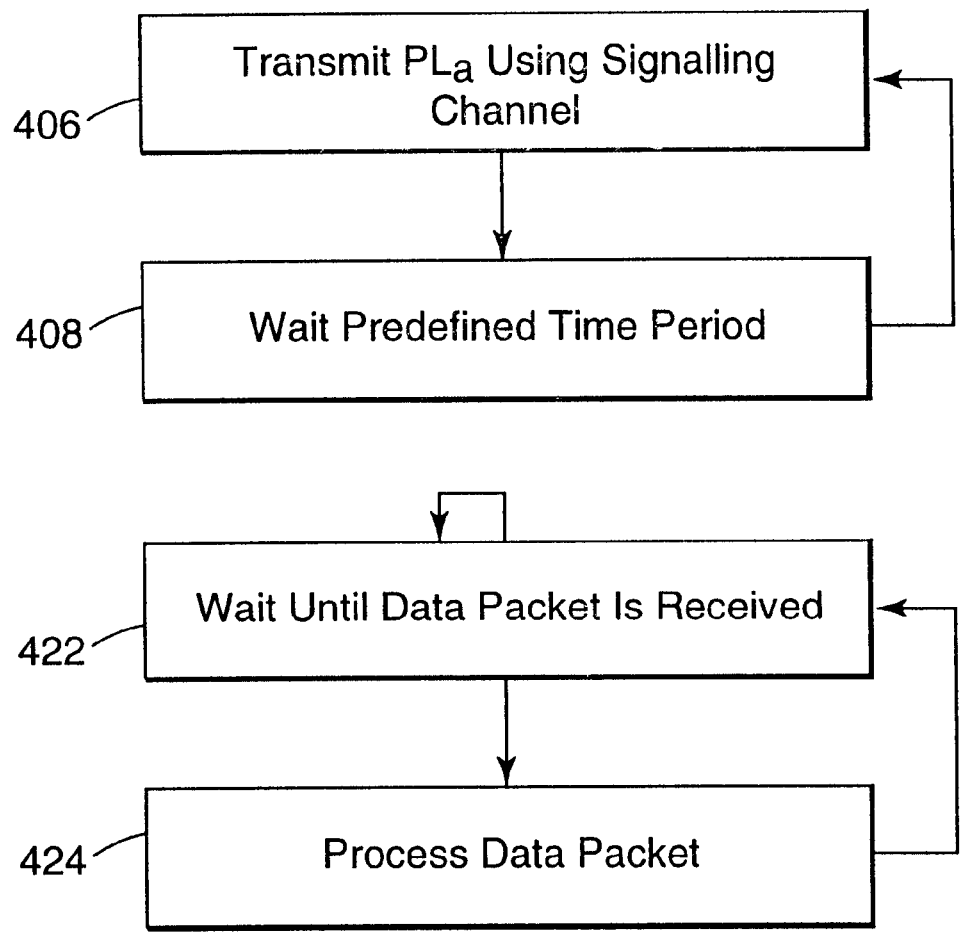

FIGS. 15A and 15B are flow diagrams illustrating a manner of providing CDMA-transmitted data packets in the uplink direction (MS to BTS) in a distributed, priority-based, packet management system. In this embodiment, the MS and the BTS share the responsibility of performing the SIMA functions, such as measurement of the MBR, determination of the packet priority level PL using the ratio of the MBR to the established NBR, and acceptance or suspension (or discarding) of the packet depending on the load of the CDMA interface.

Referring now to FIG. 15A, a flow diagram is provided which illustrates one manner in which the mobile station performs a portion of the priority-based, packet selection functions during data uplink transmissions. MS transmissions are idle until data is available to be sent to the trunking network, as seen at block 400. In this distributed embodiment, the MS, rather than the trunking network, measures 402 the bit rate (MBR). Based on the MBR and established NBR, the MS calculates 404 the priority PL for the particular packet.

Meanwhile, the trunking network determines the allowed priority level $PL_a$ from the channel load, and transmits the $PL_a$ using a signaling channel as seen in FIG. 15B. While this function could be performed in the MS as well, this would require that the MS monitor the number of users on the radio interface, which is more complicated in a CDMA system. On the other hand, the trunking network is already aware of the number of concurrent users occupying the connection. The trunking network, by way of the BTS, preferably transmits 406 the $PL_a$ continuously or at regular intervals over the signaling channel. Alternatively, the BTS can transmit 406 the $PL_a$ upon request by the MS, although the more straightforward approach is through continuous or periodic transmissions. In the case of periodic transmissions of $PL_a$, the BTS waits 408 a predetermined time between $PL_a$ transmissions.

Returning to FIG. 15A, the MS receives 410 the $PL_a$ from the BTS, and performs a comparison 412 of the priority level (PL) of the data packet and the allowed priority level ($PL_a$) of the CDMA connection. If the PL is less than $PL_a$ (i.e., PL is greater than or equal to $PL_a$), the MS does not allow the data packet to be transmitted on the CDMA interface, and the system optionally waits 414 a predetermined period of time, whether fixed, random, or based on a predetermined algorithm. This optional waiting period continues until the measured bit rate drops enough due to the elapsed time or until the load of the radio interface decreases. If the packet has not become obsolete and is therefore still valid as determined at block 416, the MS again measures 402 the bit rate to ultimately determine 412 whether the packet can be transmitted. Where the data is time sensitive and therefore is no longer valid following the predetermined time period, the packet is discarded 418. Where the PL is not less than $PL_a$, the MS transmits 420 the data packet.

The BTS waits until the MS has transmitted 420 the data packet, as seen at block 422 of FIG. 15B. Once the MS has transmitted 420 the packet, and the BTS has received 422 the packet, the trunking network processes 424 the data packet.

The embodiment of FIGS. 15A and 15B illustrate how the signaling can be reduced to simply broadcasting the $PL_a$ from the BTS to the mobile stations operating in connection with the BTS. If connection capacity is available depending on the particular nominal bit rate associated with a particular mobile station, the mobile station simply begins to transmit the data packets, and no complicated control mechanisms are required in the cellular network to allocate wireless resources.

The downlink transmissions for the distributed implementation involves execution of the priority-based selection functions at the trunking network. Therefore, the uplink mainly utilizes the MS to execute the priority-based selection functions, the BTS performs most, if not all, of these selection functions for downlink transmissions. More particularly, the embodiment illustrated in FIGS. 14A and 14B can be used for downlink transmissions of the distributed system.

Figure 16:
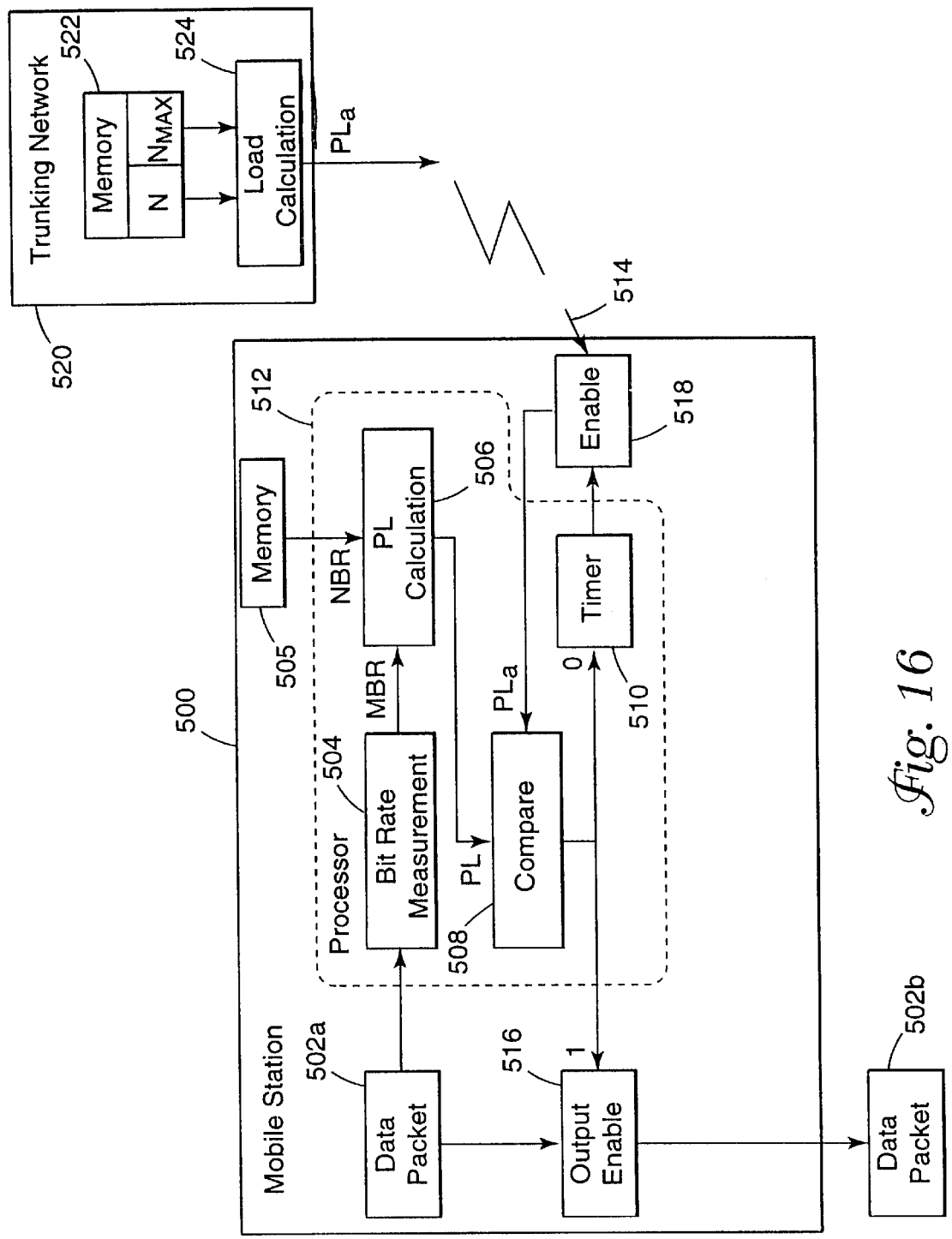
FIG. 16 is a block diagram illustrating one embodiment a mobile station and trunking network capable of providing CDMA-transmitted data packets in the uplink direction (MS to BTS) in a distributed, priority-based, packet management system in accordance with the present invention.

FIG. 16 is a block diagram illustrating one embodiment a mobile station and trunking network capable of providing CDMA-transmitted data packets in the uplink direction (MS to BTS) in a distributed, priority-based, packet management system. This particular embodiment is capable of accomplishing the general flow illustrated in FIGS. 15A and 15B, and represents the shared responsibility in performing the SIMA functions. As will be readily apparent to those skilled in the art from the description of FIGS. 13A, 13B, 14A, 14B, 15A, 15B and 16, a similar structure can be applied in the case of a centralized implementation—the difference being the location of the structure. For example, for the centralized implementation described in FIGS. 13A, 13B, 14A and 14B, many of the functions shown in FIG. 16 to be performed by the mobile station are instead performed at the trunking network.

In FIG. 16, the mobile station (MS) 500 includes functionality capable of making a determination as to whether the data packet can be transmitted to the trunking network, depending on the priority level of the packet and the allowed priority level of the CDMA connection. MS transmissions are idle until data is available to be sent to the trunking network, at which time the data packet 502*a* becomes available. A bit rate measurement unit 504, a priority level (PL) calculation unit 506, a comparator 508 and a timer 510 perform many of the priority-based functions required. Some or all of these functions can be realized using discrete circuitry, or alternatively can be accomplished using a processor 512.

In this distributed embodiment, the MS, rather than the trunking network, measures the bit rate (MBR) at the bit rate measurement unit 504. Based on the MBR and established NBR stored in memory 505, the MS calculates the priority PL for the particular packet at the PL calculation unit 506. The PL calculation unit 506 uses the ratio of the MBR and the established NBR to determine the PL, and in one embodiment, it is calculated using Equation [1] above.

The allowed priority level $PL_a$ is calculated at the trunking network 520 in the distributed implementation. A memory 522 stores the number N of users occupying the CDMA interface, and the maximum number $N_{max}$ of users allowed on the CDMA interface such that a predetermined signal-to-noise ratio is not exceeded. The load calculation unit 524 calculates a current load condition of the CDMA interface based on a ratio of the number N of users occupying the CDMA interface and the maximum number $N_{max}$ of users allowed on the CDMA interface. The load calculation unit 524 converts the load condition to an allowed priority level $PL_a$ indicative of the priority level of a packet that is required to gain access to the CDMA interface.

The mobile station 500 receives the allowed priority level as shown on signal line 514. The signal is provided to the comparator 508 to be compared with the PL from the PL calculation unit 506. If the PL is high enough to surpass the allowed packet priority threshold, the output enable 516 is activated by an output signal of the comparator 508. In this case, the data packet 502*a* is transmitted from the mobile station 500 as represented by data packet 502*b*.

If the PL does not reach the allowed packet priority threshold, the output enable 516 is not activated, and a timer 510 is initiated. After a predetermined time period, the timer allows the enable circuit 518 to pass subsequent $PL_a$ signals to the comparator 508. This can repeat until the $PL_a$ decreases to a point that the PL can be output from the mobile station. Alternatively, the data packet 502*a* can be discarded after repeated attempts, or can be discarded immediately upon recognition that the PL had not reached the allowed packet priority threshold.

From analysis of the distributed embodiment of FIG. 16, those skilled in the art can appreciate an analogous embodiment for the centralized embodiment. For example, a more centralized embodiment may incorporate the bit rate measurement unit 504, the memory 505, the PL calculation unit 506 and the comparator 508 into the trunking network. Furthermore, the centralized embodiment discussed in connection with FIGS. 13A, 13B, 14A and 14B include additional circuitry, such as a transceiver, to accomplish the signalling for the data packet transmission request and request response. Such transmitters and receivers (or transceivers) are known in the art and need not be described further here.

It will, of course, be understood that various modifications and additions can be made to the various embodiments discussed hereinabove without departing from the scope or spirit of the present invention. For example, the present invention contemplates the use of a CDMA radio interface that transports data packets, including voice, video, data or other digitized information. For illustrative purposes, the CDMA interface of the present invention is described in the context of a cellular network in the aforementioned diagrams for illustrative purposes, however the CDMA interface according to the present invention is not limited thereto. The invention is equally applicable to other CDMA interfaces, including the mobile station and cellular trunking network, local area networks (LANs), two mobile stations, and the like. Furthermore, the particular functions identified in the distributed embodiment described may modified to redistribute the responsibilities among the trunking network and the mobile communication units without departing from the scope and spirt of the invention. Accordingly, the scope of the present invention should not be limited by the particular embodiments discussed above, but should be defined only by the claims set forth below and equivalents thereof.

What is claimed is:

1. A method for selectively allocating data packet transfers over a wireless interface operating under a Code Division Multiple Access (CDMA) protocol, comprising:

establishing a nominal bit rate for each of a plurality of users having access to the CDMA interface;

calculating a relative packet priority for each of a plurality of data packets based on an actual bit rate of a packet source at the CDMA interface and the nominal bit rate established for the corresponding one of the users;

determining an allowable packet priority for the CDMA interface based on a signal-to-noise ratio of the CDMA interface; and transmitting those of the plurality of data packets having a relative packet priority greater than or equal to the allowable packet priority of the CDMA interface.

2. The method of claim 1, further comprising measuring a rate of bit transmission of the data packet entering the CDMA interface to determine the actual bit rate of the data packet transmission.

3. The method of claim 1, further comprising assigning a priority value representative of the relative packet priority to each of the corresponding data packets at a time of transmission of the data packets.

4. The method of claim 3, further comprising storing the priority value as part of a header in the data packet.

5. The method of claim 1, wherein calculating a relative packet priority comprises:

measuring an actual bit rate of the data packet transmission from the source at the CDMA interface; and calculating the relative packet priority as a ratio of the actual bit rate to the established nominal bit rate.

6. The method of claim 1, wherein calculating a relative packet priority is performed according to the equation:

$$x = 4.5 + \frac{\ln(MBR_i/NBR)}{\ln(2)} \quad [1]$$

$$PL_i = \begin{cases} 7 & \text{if } x \geq 7 \\ \lfloor x \rfloor & \text{if } 0 < x < 7 \\ 0 & \text{if } x \leq 0, \end{cases}$$

where, $MBR_i$ represents the actual bit rate of the i:th data packet transmitted over the CDMA interface, NBR represents the established nominal bit rate, [x] represents an integer portion of x, and $PL_i$ represents the relative priority level of the i:th data packet transmitted over the CDMA interface.

7. The method of claim 1, wherein the nominal bit rate established with respect to a particular user is proportional to a quality of service cost payable by the user.

8. The method of claim 1, wherein determining an allowable packet priority comprises:
   determining a number of users occupying the CDMA interface;
   determining a maximum number of users allowed on the CDMA interface such that a predetermined signal-to-noise ratio is not exceeded;
   calculating a calculated current load condition on the CDMA interface based on a ratio of the number of users occupying the CDMA interface and the maximum number of users allowed on the CDMA inter ace;
   partitioning a range of possible load conditions into a plurality of allowable priority levels; and
   assigning an allowable priority level corresponding to the calculated current load condition as a current allowable priority level for the CDMA interface.

9. The method of claim 8, wherein partitioning the range of possible load conditions comprises linearly apportioning the range of possible load conditions into the plurality of allowable priority levels.

10. The method of claim 8, further comprising comparing the relative packet priority to the current allowable packet priority to determine which data packets may be transmitted in accordance with the predetermined signal-to-noise ratio.

11. The method of claim 10, further comprising discarding the data packets having a relative packet priority less than the allowable packet priority of the CDMA interface.

12. The method of claim 10, further comprising suspending transmission of the data packets having a relative packet priority less than the allowable packet priority of the CDMA interface.

13. The method of claim 12, wherein suspending transmission of the data packets comprises disallowing transmission of the data packets for a predetermined time period.

14. The method of claim 13, further comprising repeatedly determining the allowable packet priority for the CDMA interface upon a lapse of the predetermined time period, and transmitting the data packets if the relative packet priority reaches or exceeds the allowable packet priority of the CDMA interface.

15. A method for selectively allocating data packet transmission over a wireless interface implementing a Code Division Multiple Access (CDMA) protocol, for data packet transmission from a mobile communication unit (MCU) to a trunking network, the method comprising:
   transmitting a transmit request signal from the MCU to the trunking network via a signalling channel;
   providing a request response from the trucking network to the MCU indicative of whether the trunking network permits the data packet transmission, comprising:
      establishing a nominal bit rate for each of a plurality of users having access to the CDMA interface;
      calculating, at the trunking network, a relative packet priority for each of the data packets based on an actual bit rate at a source at the CDMA interface and the nominal bit rate established for the corresponding one of the plurality of users;
      calculating, at the trunking network, a current allowable packet priority for the CDMA interface based on a signal-to-noise ratio of the CDMA interface;
      comparing, at the trunking network, the relative packet priority for each of the data packets to the current allowable packet priority of the CDMA interface; and
      setting the request response to indicate whether the data packet has a sufficiently high relative packet priority to gain access to the CDMA interface; and
   receiving the request response from the trunking network at the MCU, and transmitting the data packets to the trunking network if the request response indicates that the relative packet priority is sufficiently high to gain access to the CDMA interface.

16. The method of claim 15, wherein transmitting a request signal further comprises transmitting a length of the data packet to be transmitted.

17. The method of claim 16, wherein calculating the relative packet priority comprises a step for performing a calculation of the actual bit rate.

18. The method of claim 15, wherein calculating a current allowable packet priority for the CDMA interface comprises:
   determining a number of users occupying the CDMA interface;
   determining a maximum number of users allowed on the CDMA interface such that a predetermined signal-to-noise ratio is not exceeded;
   calculating a current load condition on the CDMA interface based on a ratio of the number of users occupying the CDMA inter ace and the maximum number of users allowed on the CDMA interface;
   partitioning a range of possible load conditions into a plurality of allowable priority levels; and
   assigning one of the plurality of allowable priority levels corresponding to the calculated current load condition as a current allowable priority level for the CDMA interface.

19. The method of claim 18, further comprising comparing the relative packet priority to the current allowable packet priority to determine which data packets may be transmitted.

20. The method of claim 19, further comprising:
   suspending transmission of the data packets having a relative packet priority less than the current allowable packet priority of the CDMA interface for a predetermined time period;
   repeatedly determining the current allowable packet priority for the CDMA interface upon expiration of the predetermined time period; and
   transmitting the data packets if the relative packet priority reaches or exceeds the current allowable packet priority of the CDMA interface.

21. A method for selectively allocating data packet transmission over a wireless interface implementing a Code Division Multiple Access (CDMA) protocol, for data packet transmission from a trunking network to a mobile communication unit (MCU), the method comprising:
   establishing a nominal bit rate for each o a plurality of users having access to the CDMA interface;
   calculating, at the trunking network, a relative packet priority for each of the data packets based on an actual bit rate of a source at the CDMA interface and the nominal bit rate established for the corresponding one of the plurality of users;
   calculating, at the trunking network, a cur rent allowable packet priority for the CDMA interface based on a signal-to-noise ratio of the CDMA interface;

comparing, at the trunking network, the relative packet priority for each of the data packets to the current allowable packet priority of the CDMA interface; and transmitting the data packets from the trunking network to the MCU if the relative packet priority of the data packets is equal to or greater than the current allowable packet priority of the CDMA interface.

22. The method of claim 21, wherein calculating the relative packet priority comprises a step for performing a calculation of the actual bit rate.

23. The method of claim 21, wherein calculating a current allowable packet priority for the CDMA interface comprises:

determining a number of users occupying the CDMA interface;

determining a maximum number of users allowed on the CDMA interface such that a predetermined signal-to-noise ratio is not exceeded;

calculating a current load condition on the CDMA interface based on a ratio of the number of users occupying the CDMA interace and the maximum number of users allowed on the CDMA interface;

partitioning a range of possible load conditions into a plurality of allowable priority levels; and assigning one of the plurality of allowable priority levels corresponding to the calculated current load condition as the current allowable priority level for the CDMA interface.

24. The method of claim 21, further comprising:

suspending transmission of the data packets having a relative packet priority less than the current allowable packet priority of the CDMA interface for a predetermined time period;

repeatedly determining the current allowable packet priority for the CDMA interface upon expiration of the predetermined time period; and transmitting the data packets if the relative packet priority reaches or exceeds the current allowable packet priority of the CDMA interface.

25. The method of claim 21, further comprising discarding the data packets having a relative packet priority less than the current allowable packet priority of the CDMA interface.

26. A method for selectively allocating data packet transmission over a wireless interface implementing a Code Division Multiple Access (CDMA) protocol, for data packet transmission from a mobile communication unit (MCU) to a trunking network, the method comprising:

establishing a nominal bit rate for each of a plurality of users having access to the CDMA interface;

calculating, at the MCU, a relative packet priority for each of the data packets based on an actual bit rate of a source at the CDMA interface and the nominal bit rate established for the corresponding one of the users;

calculating, at the trunking network, a current allowable packet priority for the CDMA interface based on a signal-to-noise ratio of the CDMA interface;

transmitting the current allowable packet priority from the trunking network to the MCU via a signalling channel;

comparing, at the MCU, the relative packet priority for each of the data packets to the current allowable packet priority of the CDMA interface; and transmitting the data packets from the MCU to the trunking network if the relative packet priority is equal to or greater than the current allowable packet priority at the CDMA interface.

27. The method of claim 26, wherein calculating a current allowable packet priority for the CDMA interface comprises:

determining a number of users occupying the CDMA interface;

determining a maximum number of users allowed on the CDMA interface such that a predetermined signal-to-noise ratio is not exceeded;

calculating a current load condition on the CDMA interface based on a ratio of the number of users occupying the CDMA interface and the maximum number of users allowed on the CDMA interface;

partitioning a range of possible load conditions into a plurality of allowable priority levels; and assigning one of the plurality of allowable priority level corresponding to the calculated current load condition as the current allowable priority level for the CDMA interface.

28. The method of claim 26, further comprising:

suspending transmission of the data packets having a relative packet priority less than the current allowable packet priority of the CDMA interface for a predetermined time period;

repeatedly determining the current allowable packet priority for the CDMA interface upon expiration of the predetermined time period; and transmitting the data packets if the relative packet priority reaches or exceeds the current allowable packet priority of the CDMA interface.

29. A system for selectively allocating data packet transfers over a wireless interface operating under a Code Division Multiple Access (CDMA) protocol, for data packet transmission between one or more mobile communication units (MCU) and a trunking network, the system comprising:

a memory to store a nominal bit rate indicator assigned to each potential connection of the CDMA interface;

a bit rate measurement unit to receive a data packet ready for transmission via the CDMA interface and to measure the bit rate at which the data packet will be transmitted;

a packet priority level calculation unit coupled to receive the measured bit rate and the nominal bit rate indicator, and to calculate a packet priority level for the data packet in response thereto;

a comparator coupled to receive the pack t priority level, and to receive an allowable packet priority level corresponding to the packet priority level required to access the CDMA interface, and to output an enable signal indicative of whether or not the packet priority level is greater than the allowable packet priority level; and an output register to enable transmission of the data packet when the enable signal indicates that the packet priority level is greater than the allowable packet priority level.

30. The system as in claim 29, further comprising:

a timer circuit coupled to the comparator to receive the enable signal, and to effect a predetermined time delay when the enable signal indicates that the packet priority level is not greater than the allowable packet priority level; and an input enable circuit coupled to the timer allow input of a current state of the allowable packet priority level, and coupled to the comparator to allow further comparisons of the packet priority level of the data packet and the allowable packet priority level.

31. The system as in claim 29, further comprising:

a memory to store a number N of users occupying the CDMA interface, and to store a maximum number $N_{max}$ of users allowed on the CDMA interface such that a predetermined signal-to-noise ratio is not exceeded; and a load calculation unit coupled to receive N and $N_{max}$ and calculate a current load condition based on a ratio of N and $N_{max}$, and to convert the load condition into the allowable packet priority level.

32. The system as in claim 31, wherein the bit rate measurement unit, the packet priority level calculation unit, and the comparator are implemented in the MCU.

33. The system as in claim 31, wherein the bit rate measurement unit, the packet priority level calculation unit, and the comparator are implemented in the trunking network.

34. The system as in claim 33, further comprising a transceiver in each of the MCU and the trunking network, wherein the transceiver in the MCU transmits a request signal to the trunking network via a signalling channel, the transceiver in the trunking network receives the request signal and transmits a request response to the MCU indicative of whether the packet priority level of the data packet is greater than the allowable packet priority level, and the transceiver in the MCU receives and routes the request response to the output register to enable transmission of the data packet when the request response indicates that the packet priority level is greater than the allowable packet priority level.

* * * * *